US005660806A

United States Patent [19]

Fristad et al.

[11] Patent Number: 5,660,806
[45] Date of Patent: Aug. 26, 1997

[54] PROCESS FOR REMOVING LEAD FROM SANDBLASTING WASTES CONTAINING PAINT CHIPS

[75] Inventors: William E. Fristad, Santa Rosa, Calif.; Michael J. Virnig, Tucson, Ariz.; Dana K. Elliott, Santa Rosa, Calif.

[73] Assignee: Henkel Corporation, Plymouth Meeting, Pa.

[21] Appl. No.: 474,815

[22] Filed: Jun. 7, 1995

Related U.S. Application Data

[63] Continuation-in-part of Ser. No. 930,638, Aug. 17, 1992, Pat. No. 5,494,649, which is a continuation-in-part of Ser. No. 771,286, Oct. 3, 1991, abandoned.

[51] Int. Cl.[6] ............................ C01G 21/00; C22B 13/00
[52] U.S. Cl. .................................................. 423/98; 75/725
[58] Field of Search .......................... 423/27, 98; 75/725, 75/726; 252/DIG. 8; 510/206

[56] References Cited

U.S. PATENT DOCUMENTS

| | | | |
|---|---|---|---|
| Re. 17,276 | 4/1924 | Glaeser . | |
| 1,143,110 | 6/1915 | Ellis | 252/DIG. 8 |
| 1,480,110 | 1/1924 | Platten . | |
| 1,731,699 | 10/1929 | Cavalli . | |
| 1,774,883 | 9/1930 | Glaeser . | |
| 2,128,548 | 8/1938 | White | 423/98 |
| 2,328,089 | 8/1943 | Mulligan | 423/98 |
| 2,648,601 | 8/1953 | Byler et al. | 75/195 |
| 2,873,289 | 2/1959 | MacKellar | 260/431 |
| 3,106,929 | 10/1963 | Friedrich | 252/DIG. 8 |
| 3,394,061 | 7/1968 | DeForest et al. | 423/98 |
| 3,424,552 | 1/1969 | Cadmus | 23/87 |
| 3,476,552 | 11/1969 | Parks et al. | 75/101 |
| 3,627,482 | 12/1971 | Olson et al. | 23/87 R |
| 3,697,567 | 10/1972 | Taylor, Jr. | 75/725 |
| 3,930,847 | 1/1976 | Stern | 75/726 |
| 3,993,804 | 11/1976 | McCready et al. | 252/DIG. 8 |
| 4,039,471 | 8/1977 | McArthur | 423/213.5 |
| 4,060,410 | 11/1977 | Laszlo | 75/109 |
| 4,082,546 | 4/1978 | Wallace | 75/725 |
| 4,112,191 | 9/1978 | Anderson | 427/333 |
| 4,113,471 | 9/1978 | Langhorst et al. | 423/98 |
| 4,120,810 | 10/1978 | Palmer | 252/542 |
| 4,216,187 | 8/1980 | Dowd | 423/98 |
| 4,317,803 | 3/1982 | Wilkomirsky et al. | 423/98 |
| 4,352,786 | 10/1982 | Hoh et al. | 423/98 |
| 4,372,782 | 2/1983 | Salter et al. | 423/98 |
| 4,410,496 | 10/1983 | Smyres et al. | 423/98 |
| 4,435,284 | 3/1984 | Heytmeijer | 209/3 |
| 4,552,589 | 11/1985 | Mason et al. | 423/27 |
| 4,557,759 | 12/1985 | McGrew et al. | 75/118 R |

(List continued on next page.)

FOREIGN PATENT DOCUMENTS

| | | |
|---|---|---|
| 517626 | 10/1955 | Canada . |
| 1152754 | 8/1983 | Canada . |
| 0278328 | 6/1988 | European Pat. Off. . |
| 88118930 | 11/1988 | European Pat. Off. . |
| 0291746 | 11/1988 | European Pat. Off. . |
| 319740 | 6/1989 | European Pat. Off. . |
| 342898 | 11/1989 | European Pat. Off. . |
| 0377766 | 7/1990 | European Pat. Off. . |
| 0402737 | 12/1990 | European Pat. Off. . |
| 1377900 | 9/1964 | France . |
| 2495640 | 6/1981 | France . |
| 0487006 | 11/1929 | Germany . |
| 2647007 | 6/1977 | Germany . |
| 207933 | 9/1981 | Germany . |
| 207311 | 1/1982 | Germany . |
| 3742235 | 7/1988 | Germany . |
| 3703922 | 8/1988 | Germany . |
| 3705519 | 9/1988 | Germany . |
| 3928427 | 8/1989 | Germany . |
| 3812986 | 11/1989 | Germany . |
| 3814684 | 11/1989 | Germany . |
| 48-75354 | 10/1973 | Japan . |
| 56-07697 | 1/1981 | Japan . |
| 63-156586 | 6/1988 | Japan . |
| 431115 | 6/1974 | U.S.S.R. . |
| 710487 | 10/1981 | U.S.S.R. . |
| 1444377 | 12/1988 | U.S.S.R. . |
| 0285462 | 5/1929 | United Kingdom . |

OTHER PUBLICATIONS

Draft Report to the EPA, Contract No. 68–03–3255, US EPA, Emergency Response Branch, Edison, NJ, 1986, no month.
CSIRO Aust. Div. Soils Tech. Pap. No. 41, 1979, 1–17, no month.
Sci. Total Environ. 1989, 79, 253–270, no month.
Geoderma 1971 5, 197–208, no month.
Soil Sci. Soc. Am. J. 1986, 50, 598–601, no month.
Can. J. Soil Sci. 1976, 56, 37–42, no month.
Can. J. Soil Sci. 1969, 49, 327–334, no month.
Plant and Soil 1973, 38, 605–619, no month.
Environ. Prog. 1990, 9, 79–86, May.
Chemiker–Zeitung 1982, 106, 289–292, no month.
J. Indian Chem. Soc., Sect. A 1982, 21A 444–446, no month.
Hydrometallurgy 1987, 17, 215–228, no month.
Nippon Kinzoku Gakkaishi 1978, 42(10), 1007–12 (Japan) no month.
Hydrometallurgy 1985, 14(2), 171–188 no month.
J. Indian Chem. Soc. 1985, 62, 707–709, no month.
J. Anal. Chem. USSR, 1983, 38, 630–635, no month.
J. Inorg. Nucl. Chem. 1970, 32, 3667–3672, no month.
Russ. J. Inorg. Chem. 1960, 5, 906 no month.

(List continued on next page.)

Primary Examiner—Steven Bos
Attorney, Agent, or Firm—Ernest G. Szoke; Wayne C. Jaeschke; Patrick J. Span

[57] ABSTRACT

Heavy metals are efficiently removed from contaminated soil by a process which comprises leaching or washing the soil with a mild leachant solution comprised of an aqueous solution of an acid and a salt. Heavy metals are also efficiently removed from paint chips by washing with an aqueous acid. The heavy metals are recovered from the leachant be cementation.

7 Claims, 9 Drawing Sheets

U.S. PATENT DOCUMENTS

| | | | |
|---|---|---|---|
| 4,572,822 | 2/1986 | Abe et al. | 423/98 |
| 4,610,722 | 9/1986 | Duyvesteyn et al. | 423/98 |
| 4,614,543 | 9/1986 | Duyvesteyn et al. | 423/98 |
| 4,734,171 | 3/1988 | Murphy | 204/111 |
| 4,746,439 | 5/1988 | Newman | 210/688 |
| 4,784,757 | 11/1988 | Nelson et al. | 209/159 |
| 4,824,576 | 4/1989 | Sood et al. | 210/662 |
| 4,859,293 | 8/1989 | Hirako et al. | 204/94 |
| 4,883,599 | 11/1989 | Lindahl et al. | 210/670 |
| 4,888,053 | 12/1989 | Grayson et al. | 423/150 |
| 4,902,343 | 2/1990 | Demarthe et al. | 75/725 |
| 4,992,097 | 2/1991 | Fricker | 75/736 |
| 5,009,793 | 4/1991 | Muller | 210/710 |
| 5,013,358 | 5/1991 | Ball et al. | 75/742 |
| 5,032,175 | 7/1991 | Raborar et al. | 75/416 |
| 5,127,963 | 7/1992 | Hartup et al. | 423/89 |
| 5,193,936 | 3/1993 | Pal et al. | 210/751 |
| 5,209,774 | 5/1993 | Rockandel et al. | 75/742 |
| 5,226,545 | 7/1993 | Foust | 209/3 |
| 5,244,492 | 9/1993 | Cyr | 75/742 |
| 5,300,137 | 4/1994 | Weyand et al. | 75/670 |
| 5,342,449 | 8/1994 | Holbein et al. | 134/2 |

OTHER PUBLICATIONS

I.M.M. Bull. 1961, 70, 355 no month.

The Theory & Paractice of Ion Exchange . . . Jul., 1976, Streat, M . . . 1976, 38.1–38.7.

Trans. Instn. Min. Metall . . . 1974, 83 C101–104, no month.

Trans Instn. Min. Metall . . . 1979, 88, C31–35, no month.

Using Solvent Impregnated Carbon . . . 1985, 7, no month.

Hydrometallurgy, 1982, 8, 83–94, no month.

J. Chem. Tech. Biotechnol. 1981, 31, 345–350, no month.

Proc. Indian Acad. Sci . . . 1988, 100, 359–361, no month.

Proc. Indian Acad. Sci . . . 1988, 100, 455–457 no month.

ISEC '86 Int. Solv. Extract. Conf. Preprints, vol. II, 1986, 19–26, no month.

Hydrometallurgy 1985, 14, 387–393, no month.

Separation Science, 1971, 6, 443–450, no month.

International Conf. on New Frontiers for Hazardous Waste Mgmt., Sep., 1987.

The Fourth Environ. International Conf. 1983, 856–859, no month.

"Encyclopedia of Chemical Technology", Kirk–Othmer, 8, 727–9, no date.

Water Research 1982, 16, 1113–1118 no month.

Water Research 1986, 20, 449–452 no month.

Water Research 1982, 16, 1357–1366 no month.

Water Research 1981, 15, 275–282, no month.

Chemical and Engineering News, Aug. 26, 1991, pp. 23–44.

N. Meltzer et al., "Pollution Technology Reviews", No. 196, Noyes Data Corp., Park Ridge, NJ, 1990, pp. 373–382, no month.

L. Magos, Br. Med. Bull., 1975, 31(3) pp. 241–245, no month.

Eng. Mining J., 1970, 171(6) pp. 107–109, no month.

Chem. Abstr., 1990, 114, 232369c, no month.

Chem. Abstr., 1988, 109, 173955n, no month.

J. Ortega, J. Gutierrez, "Recovery of Valuable Products from Wastes", Ortega et al. ed. (no date).

D. Bender, F. Riordan, "Metal Bearing Waste Streams, Minimizing, Recycling and Treatment", M. Meltzer, et al., Noyes Data Corp., Pollution Technology Review, No. 196, Park Ridge, NJ, 1990, pp. 298–303, no month.

Morton Thickiol, Inc., Ven Met Brochure, Ventron Division, 1984, no month.

N. H. Feigenbaum, Ind., Wastes (Chicago), 1977, 23 no month.

Andersson, A., "On the Determination of Ecologically . . . Heavy Metals in Soils", Swedish J. agric. Res. 6, 1976, pp. 19–25, no month.

Wiklander, L., "Solubility and Uptake of Heavy Metals . . . Soil", Geoderma, 19, 1977, pp. 123–129, no month.

Norvell, W. A., "Comparison of Chelating Agents . . . Soil Materials", Soil Sci. Soc. Am. J., 48, 1984, pp. 1285–1292, no month.

Baghdady, N. H., "Extractability of Cobalt, Copper, Manganese . . . Soils of Different Origin", Acta Agric. Scand. 34, 1984, pp. 339–344, no month.

Seal, K.C., "Determination of Lead in composite pigments", Paintindia, 22(10), Oct., 1972, pp. 28–29.

Hankin, L., "Lead Content of Printed Polyethylene Food Bags", Bull. of Environ. Contam. & Tox., (12)6, 1974, pp. 645–648, no month.

Corl, W. E., "Comparison of Microwave Versus . . . Lead in Paint Chips", Spectroscopy, 6(8), 1991, pp. 40–43, no month.

Rietz et al., "Extractionsverhalten und Bindung von Schwermetallen in Boeden untersachiedlichen Belastungsgrades", Landwirtsch. Forsch., Sonderh., No. 38, 1982, pp. 382–393, no month.

Sauerbeck, et al., "Soil–Chemical Evaluation of Different Extractants for Heavy Metals in Soils", Comm. Eur. Communities, (Rep.) EUR 1983, EUR 8022, Environ. Eff. Org. Inorg. Contam. Sewage Sludge, 1983, pp. 147–160, no month.

Chem Abstracts—CA 116:66424m Erickson et al. (1992), no month.

CA 114(24): 232369c Wang et al., (1990) no month.

CA 108(6): 43320v Mitsuo et al., (1987) no month.

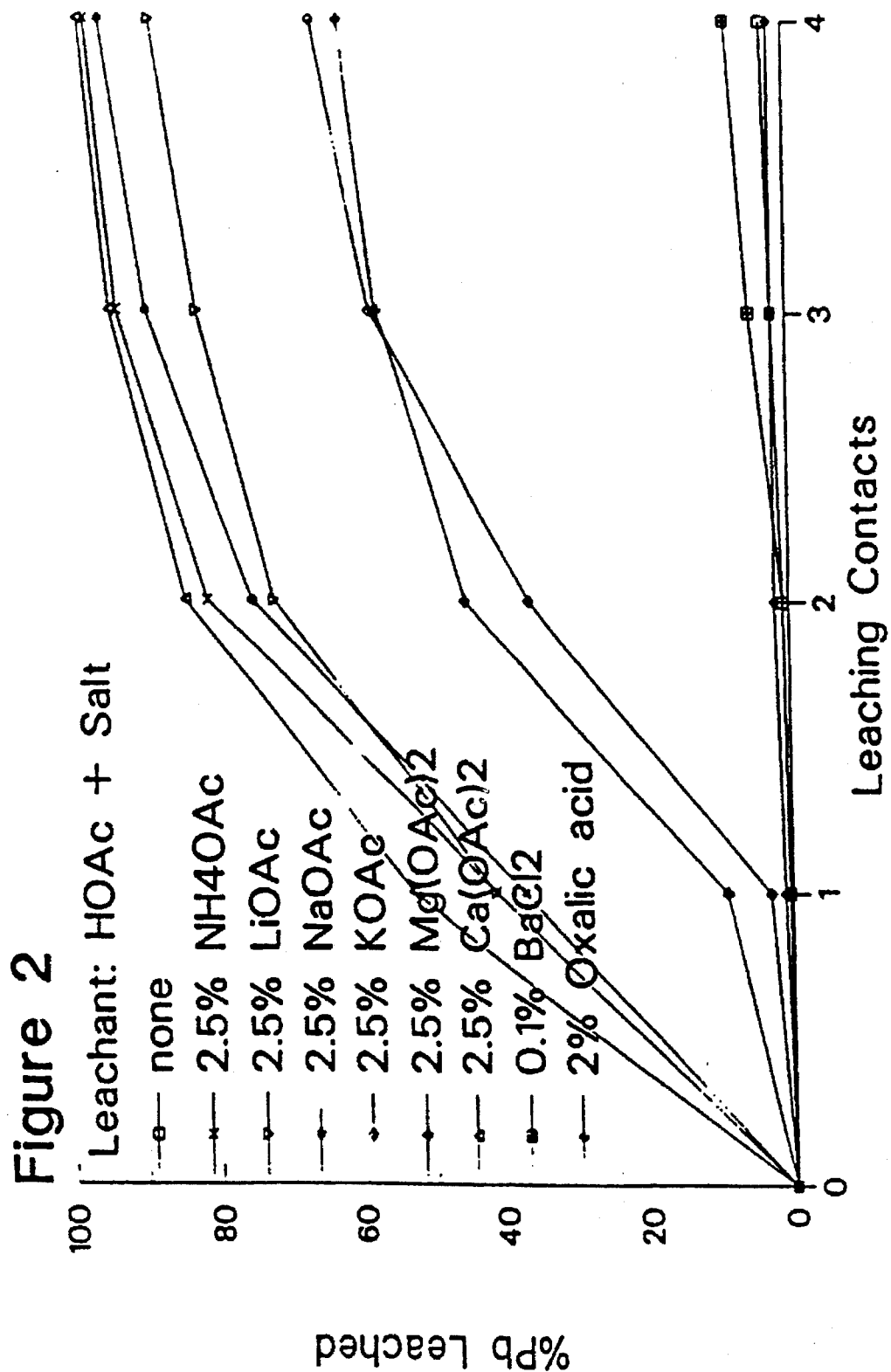

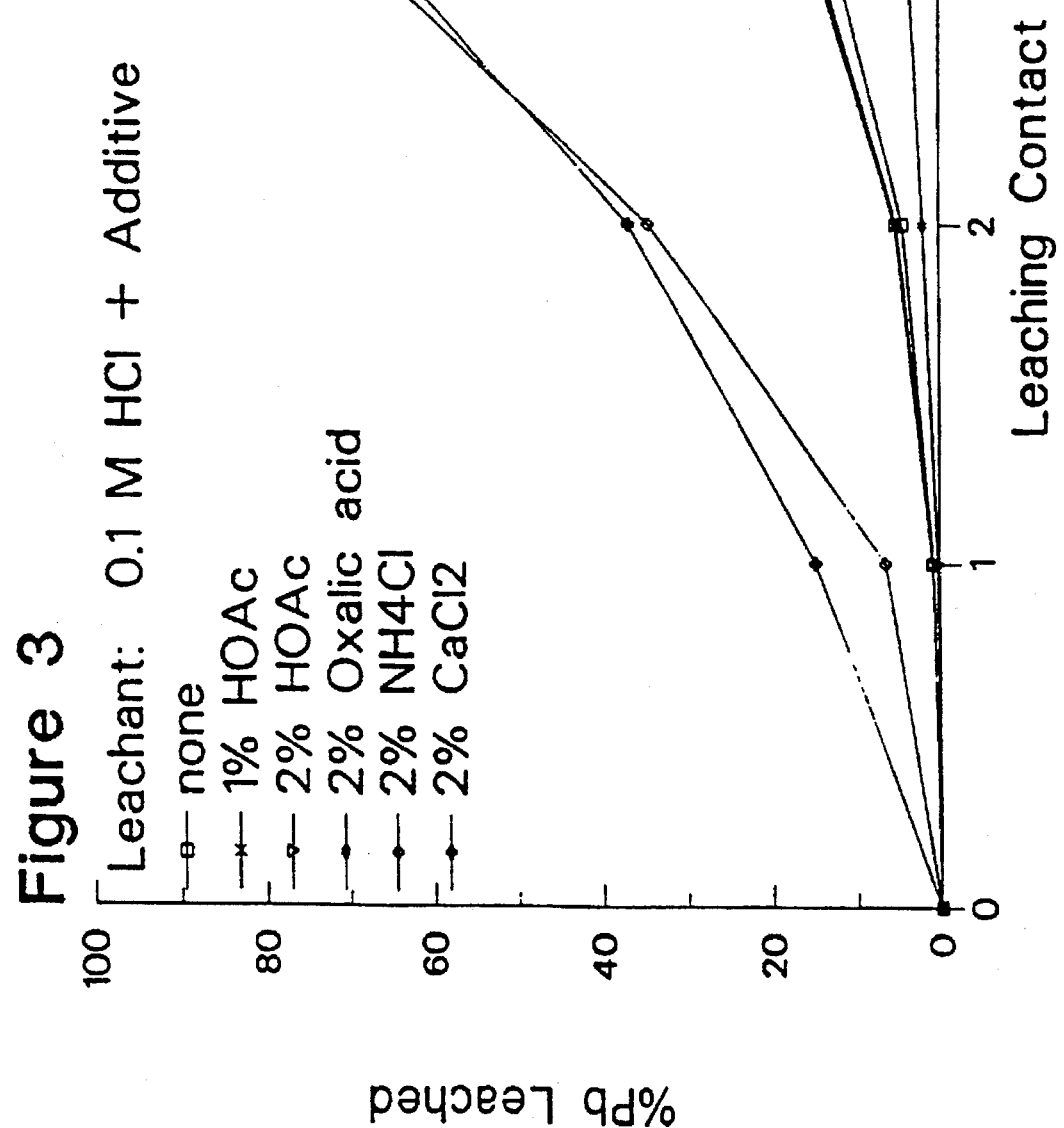

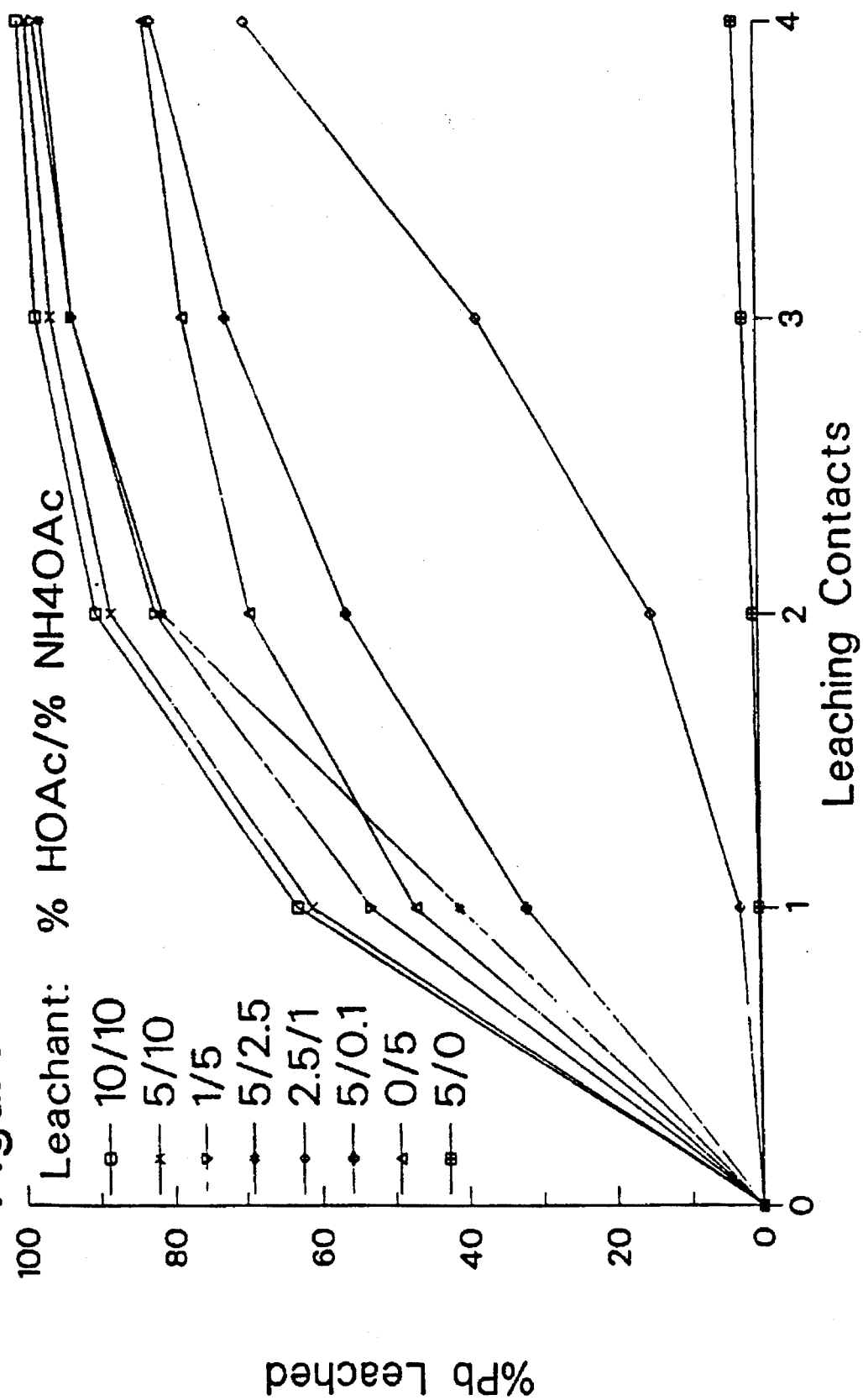

PROCESS FOR REMOVING LEAD FROM SANDBLASTING WASTES CONTAINING PAINT CHIPS

CROSS-REFERENCE TO RELATED APPLICATIONS

This application is a continuation-in-part of application Ser. No. 07/930,638 filed Aug. 17, 1992, now U.S. Pat. No. 5,494,649, the entire contents of which are incorporated by reference, which is in turn a continuation-in-part of application Ser. No. 07/771,286, filed on Oct. 3, 1991, now abandoned, the entire contents of which are incorporated herein by reference.

BACKGROUND OF THE INVENTION

1. Field of the Invention

The invention pertains to a process for removing heavy metals from soil and paint chips.

2. Description of the Related Art

The removal of heavy metal contaminants from soils represents a major contemporary environmental problem. Heavy metal pollution can leave the affected ground unusable for agricultural or residential purposes, and the metals can eventually leach into the groundwater system and lead to more widespread problems. While a number of soil classification or solidification/stabilization techniques which leave the offending metals in the soil have been developed, only removal of the metals actually solves the problem by removing the cause. Several attempts to remove metals from soils have been reported but none have been completely successful. One such method is described in Draft Report to the EPA, Contract No. 68-03-3255, US EPA, Emergency Response Branch, Edison, N.J., 1986 and CSIRO Aust. Div. Soils Tech. Pap. No. 41, 1979, 1–17 wherein the extracted metals which were bound to clay and humic materials were removed with a strong complexing agent such as EDTA. However, the EDTA remained in the wetted soil causing the treated soil to fail the TCLP test of the EPA for extractable metals. Sci. Total Environ. 1989, 79, 253–270; Geoderma 1971, 5, 197–208; Soil Sci. Soc. Am. J. 1986, 50, 598–601; Can. J. Soil Sci. 1976, 56, 37–42; Can. J. Soil Sci. 1969, 49, 327–334; and Plant Soil 1973, 38, 605–619 teach the use of aqueous acetic acid or ammonium acetate solutions as extractants. This method resulted in only slight leaching of metals from the soil. EP 278,328 (1988); Environ. Prog. 1990, 9, 79–86; EP 377,766 (1990); and Chemiker-Zeitung 1982, 106, 289–292 teach the use of strongly acidic leachant solutions such as HCl. This method leads to substantial (ca. 30%) dissolution of soil components and requires extensive basification of each HCl extract and/or the washed soil. DE 3,703,922 and DE 3,705,519 teach that isolation of the metal values is often impossible due to the metals having been precipitated as sulfides. EP 291,746 and SU 1,444,377 teach that complete separation of the soil and aqueous phases in an extraction process is difficult. J. Indian Chem. Soc., Sect. A 1982, 21A, 444–446; Hydrometallurgy 1987, 17, 215–228; Nippon Kinzoku Gakkaishi, 1978, 42, 1007–1012; Hydrometallurgy, 1985, 14, 171–188; J. Indian Chem. Soc. 1985, 62, 707–709; J. Anal. Chem. USSR, 1983, 38, 630–635; J. Inorg. Nucl. Chem. 1970, 32, 3667–3672; Russ. J. Inorg. Chem. 1960, 5, 906; I. M. M. Bull. 1961, 70, 355 and SU 710,487 teach the use of carboxylic acids such as fatty acids or Versatic™ acids for extraction of certain metals in standard liquid ion exchange processes. "The Theory and Practice of Ion Exchange: Proceedings of an International Conference," Cambridge, July 1976, Streat, M. ed., Soc. of Chemical Industry: London, 1976, 38.1–38.7; Trans. Instn. Min. Metall. (Sect. C: Mineral Process. Extr. Metall.), 1974, 83, C101–104; Trans. Instn. Min. Metall. (Sect. C: Mineral Process. Extr. Metall.), 1979, 88, C31–35; "Using Solvent-Impregnated Carbon to Recover Copper from Oxidized Mill Tailings," Rep. of Invest., USDI, Bur. Mines, No. 8966, 1985, pp 7 teach the use of solid-supported ion exchange reagents to remove copper from clarified solutions and from a slurry of oxidized mine tailings. Hydrometallurgy, 1982, 8, 83–94; J. Chem. Tech. Biotechnol. 1981, 31, 345–350; Proc.—Indian Acad. Sci., Chem. Sci. 1988, 100, 359–361; Proc.—Indian Acad. Sci., Chem. Sci. 1988, 100, 455–457 teach the use of LIX™ 34, LIX™ 622, LIX™ 51, LIX™ 54, LIX™ 70, and Kelex™ 100 as extractants for lead from aqueous feeds, but only at more basic pHs than with the carboxylic acids extractants mentioned above. "ISEC '86 Int. Solv. Extract. Conf., Preprints, Vol. II," 1986, 19–26; and Hydrometallurgy 1985, 14, 287–293 teach the use of diethylhexylphosphoric acid as a lead extractant under acidic conditions, but the S-shaped isotherm prohibits reducing the Pb concentration in the aqueous feed down to very low levels. Separation Science 1971, 6, 443–450 teaches the extraction of metals from aqueous solutions by SRS-100, a high molecular weight synthetic carboxylic acid. Various soil removal processes which include the use of mineral acids, bases, surfactants, and sequestering agents are reviewed in International Conf. on New Frontiers for Hazardous Waste Management, Sept., 1987; The Fourth Environ. International Conf. 1983, 856–895; and Environmental Progress 1990, 9, 79–86. EP 402,737 teaches that heavy metals are dissolved out of sludge by strong mineral acid, and that the resulting mineral acid solution containing the heavy metals is treatable with a heavily alkaline solution containing flocculent and foaming agent. EP 278,328 teaches a process of extracting heavy metals from contaminated soils by treating the soils with a number of successive acid extractions in a counter-current fashion and precipitating the heavy metals from the recovered acid solutions. DE 3,742,235 teaches removal of heavy metals from contaminated soils by treating the soils with a 2–40 wt. % EDTA solution having a pH of about 6. U.S. Pat. No. 4,824,576 teaches an improved process for the purification of an impure aqueous solution containing heavy metal ions which comprises passing the impure solution through a bed of activated alumina absorbent. U.S. Pat. No. 4,746,439 teaches a process for the decontamination and removal of at least one of silver, lead, chromium(III), zinc, or nickel ions from aqueous waste streams by contacting the contaminated waste water at a pH of from 4 to 6 with an alkaline earth silicate solid having a surface area in the range of about 0.1–1000 m²/g. U.S. Pat. No. 4,883,599 teaches removal of metals from aqueous solutions by passing the solutions through an ion exchange material which consists essentially of sulfhydrated cellulose.

Mercury contamination is a particularly difficult and insidious type of contamination to remediate because of the prevalence and interconvertability of ionic and elemental forms of mercury within a single site by natural weathering action as well as biological redox mechanisms. M. Meltzer, et al. [Pollution Technology Reviews, No. 196, Noyes Data Corp, Park Ridge, N.J., 1990, p. 373] teaches that water soluble and insoluble ionic mercury compounds are bioavailable for reduction to mercury metal by bacterial action, including the highly insoluble mercuric sulfide. The conversion of elemental mercury into water soluble ionic forms is also biologically possible as well as conversion into volatile dimethyl mercury. All forms and compounds of mercury are toxic including elemental mercury. ["The Merck Index," 11$^{th}$ Ed., Merck & Co., Inc., Rahway, N.J., 1989, p 5805; P. C. Bidstrup, "Toxicity of Mercury and its Compounds," Elsevier, Amsterdam, 1964; L. Magos, Br. Med. Bull. 1975, 31, 241–5] The toxicity of the elemental form can not only be experienced by direct ingestion, but also by inhalation due to the relatively high vapor pressure of mercury, $2\times10^{-3}$ mm (25° C.). The vapor pressure of mercury alone results in a concentration 200 times higher than the maximum allowed contentration, 0.01 ppm. Long exposure to mercury also produces a cummulative effect. A number of processes have been disclosed which claim to oxidatively dissolve elemental mercury and allow the reclamation of the metal. These processes all have disadvantages. Hot nitric acid solutions are known to oxidatively dissolve mercury while reducing nitrate to nitrogen oxides. [DE 3812986, 1989; DE 3703922, 1988] At room temperature an excess of nitric acid is required and extended periods of time. Under field Conditions this will produce substantial quantities of volatile and regulated nitrogen oxides which will require scrubbing before venting to the atmosphere. Additionally, nitrate contamination of groundwater remains a concern because of the large excess of nitric acid required. Hydrogen peroxide is also claimed to oxidize mercury metal to mercuric ions. [USSR 431115, 1974] Catalysis by ferric or iodide ion is also reported. [EP 88-118930, 1988] Hypochlorite in combination with hydrogen peroxide is also claimed. [JP Kokai 63156586, 1988] Hydrogen peroxide suffers the drawback in soil remediation use of being decomposed rapidly and irreversibly with manganese dioxide, a ubiquitous soil constitutent. [EP 88-118930, 1988] This reaction produces useless oxygen gas and water. Peracetic acid at 80° C. has been used to produce mercuric acetate from mercury metal. Hydrogen peroxide in the presence of acetic acid was also successful. [U.S. Pat. No. 2,873,289, 1959]. Hypochlorite oxidation of metallic mercury is known. Control of the pH and chloride ion concentration is required to ensure solubility of the mercuric ion. [U.S. Pat. No. 3,476,552, 1969; Eng. Mining J. 1970, 171, 107–9]. Halogens, including chlorine, bromine, and chlorine with a bromide ion catalyst, are known to dissolve mercury metal and mercuric sulfide. [U.S. Pat. No. 5013358, 1991; U.S. Pat. No. 3,424,552, 1969; Chem. Abstr. 1990, 114, 232369c; Chem. Abstr. 1988, 109, 173955n] In soil remediation applications, this requires the use of highly toxic, volatile and corrosive materials in highly populated areas which makes this option less desirable than its use in remote mining locations. Additionally, halogens will react rapidly with organic humic matter in the soil to produce substantial amounts of chlorinated material, including chlorinated phenols. These chlorinated species would present difficulties with regulatory agencies. Cyanide solutions are known to dissolve mercury metal to produce soluble mercuricyanide complexes. The danger of using cyanide solutions in populated areas limits the utility of this approach. In addition, thermal methods of removing mercury from contaminated soil by distilling the metal are known. These suffer the drawback of the high cost of heating soil to approximately 600° C. [DE 3928427, 1991; DE 3706684, 1987; "Treatment Technologies," US EPA, Office of Solid Waste, Government Inst., Inc., 1990, p 17–1]. Methods for treating metallic mercury and leaving it in the soil are also known. The long term acceptability of such practice is unknown. One example, ferric chloride oxidation of finely divided mercury metal, produces a thin layer of mercurous/mercuric chlorides which were reacted with a sulfide salt to produce a mercury particle reportedly coated with a layer of mercuric sulfide. This material could be further stabilized by known solidification techniques. [J P Kokai 81 07697, 1981; DE 3814684, 1989]. Amalgamation of metallic mercury with aluminum or iron deposited onto carbon is reported. The amalgam was claimed to be non-hazardous. [JP Kokai 73 75354, 1973; EP 342898, 1989]. Extraction of mercuric ions from the loaded leachate can be accomplished by a number of processes. [J. Ortega, J. Gutierrez, in "Recovery of Valuable Products from Wastes," Ortega et al. ed.] Recovery of mercury from concentrated solutions is also known by electrochemical reduction as disclosed in U.S. Pat. No. 3,647,958 and D. Bender, F. Riordan, "Metal Bearing Waste Streams, Minimizing, Recycling and Treatment," M. Meltzer, et al., ed., Noyes Data Corp., Pollution Technology Review No. 196, Park Ridge, N.J., 1990, p. 298], and by reduction by iron as disclosed in U.S. Pat. No. 5,013,358; by reduction by sodium borohydride [Morton Thiokiol, Inc., Ven Met Brochure, Ventron Division, 1984], and precipitation with sulfide is known [N. H. Feigenbaum, Ind. Wastes (Chicago), 1977, 23, 324].

SUMMARY OF THE INVENTION

It is an object of the present invention to efficiently remove heavy metals from contaminated soil or paint chips. The present invention achieves this objective by simple and concise processes. One process according to the invention removes heavy metals other than mercury including ionic forms thereof from the soil and comprises leaching or washing soil with a mild leachant. The leachant solution is comprised of an aqueous solution of an acid and a salt. The anion of the acid forms a water-soluble salt with all of the heavy metals which contaminate the soil. The salt component is comprised of at least one alkali metal, alkaline earth metal, or ammonium salt having one or more anions which also form a water-soluble salt with the heavy metals leached from the contaminated soil. The process can be modified by adding a second step. After the leachant solution has contacted the contaminated soil, a liquid phase containing dissolved heavy metal ions is formed and is separated from the solids. The clarified liquid phase which remains after the solids have separated is treated with an extractant or a precipitant to remove the heavy metal ions. Where the extractant is adsorbed on an inert solid support or is a solid ion exchange material, the process can also be modified by accomplishing simultaneously both the leaching and extraction steps described above. Where the heavy metal to be removed from the soil is mercury, another process according to the invention comprises mixing soil and a liquid leachant composition which is an aqueous solution of (i) an acid whose anion forms a water-soluble salt with mercury; (ii) an alkali metal, alkaline earth metal, or an ammonium salt having one or more anions which form water-soluble salts with mercury, and (iii) an oxidant selected from the group consisting of a persulfate salt, nitric acid, and a halogen in such a manner as to disperse at least part of said soil in the leachant to form a liquid phase containing dispersed soil solids and for a period of time sufficient to transfer at least a portion of the mercury from the dispersed solids to a soluble mercury species in the liquid phase. Another process according to the invention is directed at removing lead, tin, or copper or mixtures thereof from paint chips which have been removed from copper, tin, or lead surfaces and/or paint chips which are comprised of paint which contains copper, tin, or lead or combinations thereof. Such process comprises contacting the paint chips with an aqueous acid leachant selected from the group consisting of formic acid, acetic acid, propionic acid, methanesulfonic acid, hydrochloric acid, nitric acid, and sulfuric acid for a period of time sufficient to transfer at least a portion of one or more of copper, tin, or lead from the paint chips to one or more soluble species in the leachant. The present invention is also directed toward a process for the complete remediation of mercury from contaminated soil which comprises the steps of: (1) mixing the soil and a liquid leachant composition which is an aqueous solution of (i) an acid whose anion forms a water-soluble salt with mercury; (ii) an alkali metal, alkaline earth metal, or an ammonium salt having one or more anions which form water-soluble salts with mercury, and (iii) an oxidant selected from the group consisting of a persulfate salt, nitric acid, and a halogen in such a manner as to disperse at least part of said soil in the leachant to form a liquid phase containing dispersed soil solids and for a period of time sufficient to transfer at least a portion of the mercury from the dispersed solids to a soluble mercury species in the liquid phase; (2) contacting the liquid phase with a metal such as aluminum, iron, or magnesium to remove the soluble mercury species from liquid phase.

BRIEF DESCRIPTION OF THE DRAWINGS

FIG. 2 is a graph of the leaching effectiveness of various acetic acid solutions.

FIG. 3 is a graph of the leaching effectiveness of various hydrochloric acid solutions.

FIG. 4 is a graphic illustration of the effectiveness of various acetic acid/ammonium acetate solutions as leachants for lead.

DESCRIPTION OF THE PREFERRED EMBODIMENTS

Figure 1:
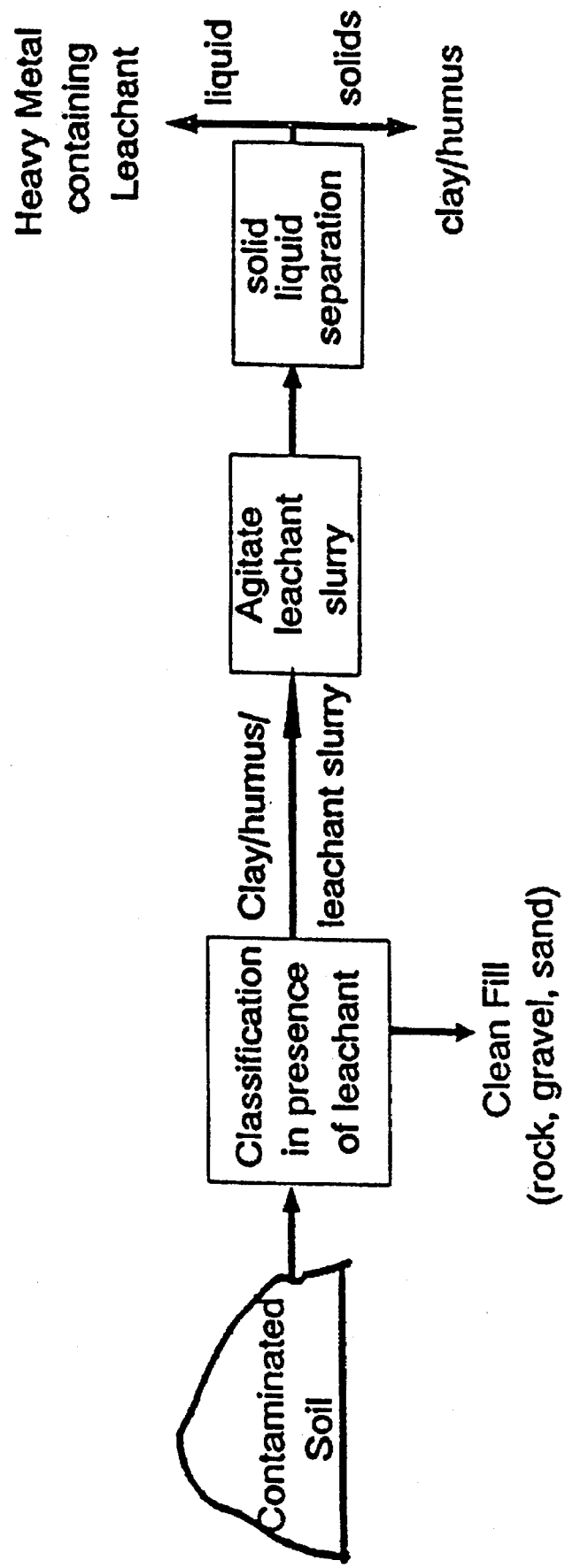
FIG. 1 is a process flow diagram for the simplest aspect of the process according to the invention which comprises a leaching step preceded by an optional classification step.

Other than in the operating examples, or where otherwise indicated, all numbers expressing quantities of ingredients or reaction conditions used herein are to be understood as modified in all instances by the term "about". For purposes of this invention, a heavy metal is a metal other than mercury and includes a transition metal, a lanthanide, an actinide, thallium, lead, bismuth or tin. The term soil means the upper layer or layers of the earth and includes sediment or silt below a body of water. Contaminated soil is soil that contains unacceptably high levels of heavy metals. Additionally, organic compounds deleterious to the health and safety of plants, animals and humans such as hydrocarbons, chlorinated hydrocarbons, poly-chlorinated biphenyls, dioxin, high concentrations of herbicides and/or insecticides, and the like may be present. Unacceptably high levels of contaminants are those levels which are higher than threshold levels set by governmental regulatory agencies. The term paint chip refers to a particle of solid paint film which had been applied to a surface as a liquid and subsequently cured to become a protective coating and then removed by some mechanical means such as by scraping, sandblasting, or blasting with plastic shot balls. The paint chips may or may not be mixed with other solid particles such as sandblasting or plastic shot residues and the like. An acid whose anion forms a water-soluble salt with a heavy metal according to the invention is any acid the anion or anions of which form a salt with a heavy metal as defined herein having a solubility in water which is equal to or greater than $10^{-4}$ moles per liter. Examples of such acids include but are not limited to formic acid, acetic acid, citric acid, propionic acid, methanesulfonic acid, hydrochloric acid, nitric acid, and sulfuric acid. A salt whose anion forms a water-soluble salt with a heavy metal according to the invention is any alkali metal, alkaline earth metal, or an ammonium salt having one or more anions which form water-soluble salts with a heavy metal as defined herein. An ammonium salt according to the invention is a salt having an ammonium ion of the formula $R_1R_2R_3NH^+$ wherein each of $R_1$, $R_2$, and $R_3$ is independently hydrogen, methyl, or ethyl. Examples of such salts include but are not limited to those salts the cations of which are $NH_4^+, Ca^{2+}, Mg^{2+}, Na^+, K^+$, or $Li^+$ and the anions are acetate, $Cl^-, NO_3^-$, or $HSO_4^-/SO_4^{2-}$.

In its simplest aspect, the process according to the invention for removing heavy metals other than mercury from soil can be carried out by mixing contaminated soil with a leachant which is an aqueous solution comprised of: (a) an acid whose anion forms a water-soluble salt with the heavy metal ions and (b) at least one alkali metal, alkaline earth metal, or ammonium salt having one or more anions which form water-soluble salts with the heavy metal ions. The contaminated soil and leachant are mixed together in any convenient manner such as by stirring the contaminated soil and the leachant solution together in a container. The ratio of soil to leachant will typically be 1 part by weight soil to from 2 to 10 parts by weight leachant. Preferably, the ratio of soil to leachant is 1 part by weight soil to from 2 to 5 parts by weight leachant. The soil will be contacted for a time sufficient to transfer at least a portion of the heavy metals to the leachant. The soil will typically be in contact with the leachant for up to 60 minutes. Soil containing elemental heavy metals may require longer leaching times to achieve dissolution. Optionally, at the start of the contacting period, a coarse solid phase of denser or larger soil particles, which is generally leached more rapidly than the soil fines, is separated by known size separation techniques, such as wet classification, centrifugal separation, hydrocyclone separation, or wet screening. Such techniques are further described in "Solids-Liquid Separation," *Chem. Eng.*, 1955, 62, 175–238, the entire contents of which is incorporated herein by reference. This operation classifies, or size segregates, the soil so that the remaining aqueous slurry contains only fine soil, silt and clay particles having a diameter of generally less than 0.02 mm. Since the majority of the heavy metal contaminants are associated with the soil fines, more extensive leaching of the soil fines is normally required than for the coarse soil components. In this way, the majority of the soil containing the coarse constituents can be quickly freed of contaminants and disposed of, and the remaining soil fines can be further leached to more completely dissolve the contained heavy metals. The process according to the invention can be carried out at any temperature and will typically be carried out at ambient temperature. The minimum acid concentration in the leachant solution must be such that a pH of 7 or below is maintained during the leaching period in which the soil and/or the soil fines are contacted by the leachant solution. The maintenance of the pH of the leachant solution can be accomplished by intermittent addition of the acid to the solution or by continuous addition of the acid to the solution. The method of addition is not critical as long as the pH is maintained below 7. While the acid concentration can be any concentration required to maintain the pH at or below 7, the maximum acid concentration in the leachant solution will typically be about 2 moles per liter. In cases where the acid is a weak acid such as acetic acid the preferred concentration is in the range of 1–10 wt % and more preferably, in the range of 1–5 wt %. In cases where the acid is a strong acid such as hydrochloric acid, the preferred concentration is in the range of 0.01–1 molar and more preferably in the range of 0.05–0.5 molar. The minimum salt concentration in the leachant solution will be typically 0.05% while the maximum salt concentration in the leachant solution will be about 20% by weight. A preferred salt concentration is within the range of 1–20 wt %. A more preferred salt concentration is within the range of 2–10%.

It is contemplated in this invention that the soil can be contacted with leachant multiple times to obtain sufficient removal of the heavy metals. Liquid-solid separation of partially leached soil gives a liquid phase containing a portion of the total of the heavy metal ions originally present in the soil and a solid phase which can be recycled for further leaching with fresh or regenerated leachant. Contacting and separating soil and leachant can be done continuously or in a batch mode.

FIG. 1 is a process flow diagram for the simplest aspect of the process according to the invention, in which soil is agitated with the leachant. The total time required to leach the heavy metals from the soil or soil fines and will typically take about 60 minutes or less. Optionally, the leaching step may be preceded by a classification step in the presence of the leachant to wash and remove a coarse fraction of soil. After the leaching step, the soil fines can optionally be separated from the leachant in the solid/liquid separation step. The soil or clay/humus soil fines may be disposed of if they are sufficiently free of heavy metals or they may be subjected to further leaching.

Figure 5:
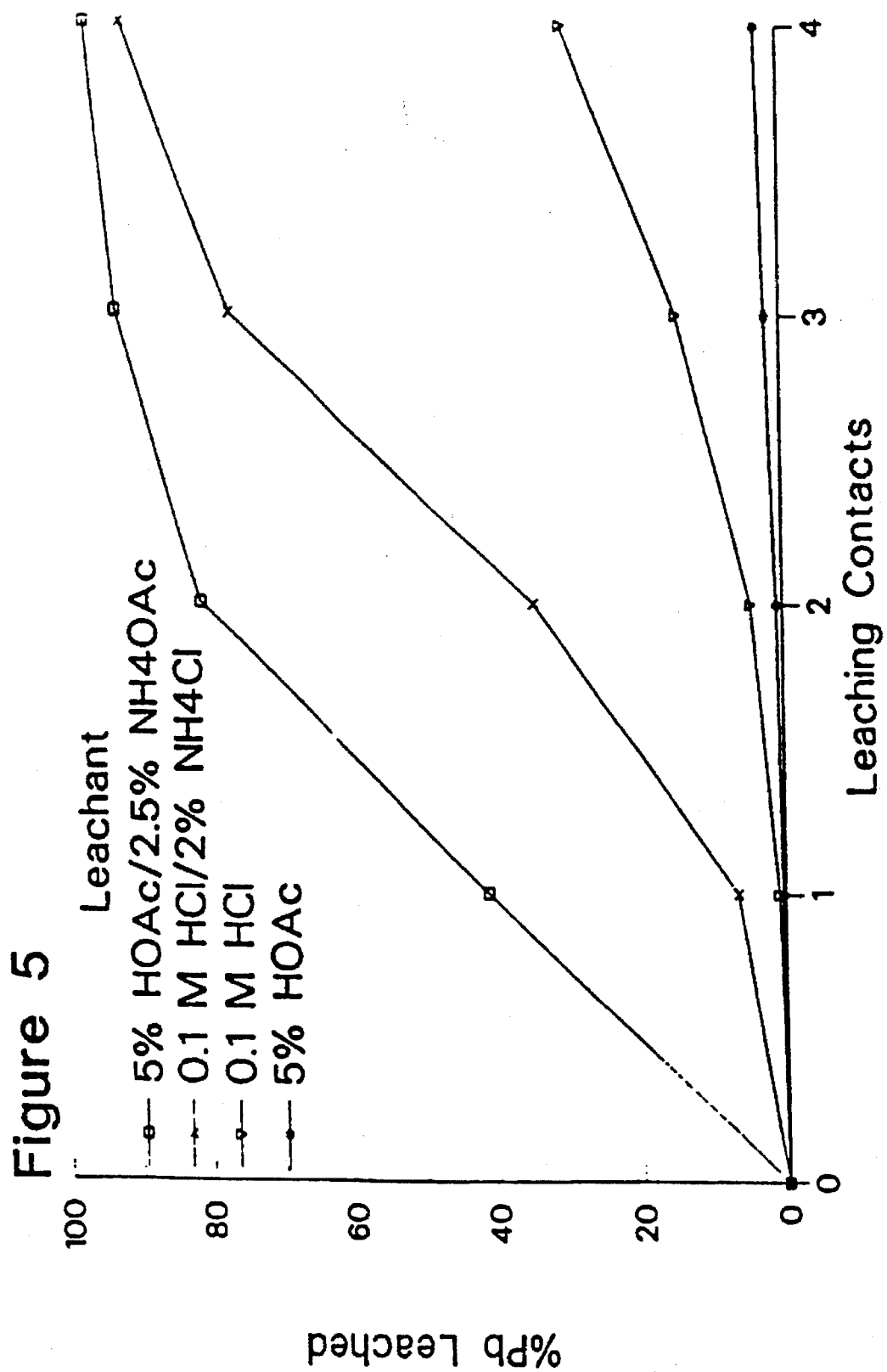
FIG. 5 is a graphic illustration of the relative effectiveness of various solutions as leachants for lead.
Figure 6:
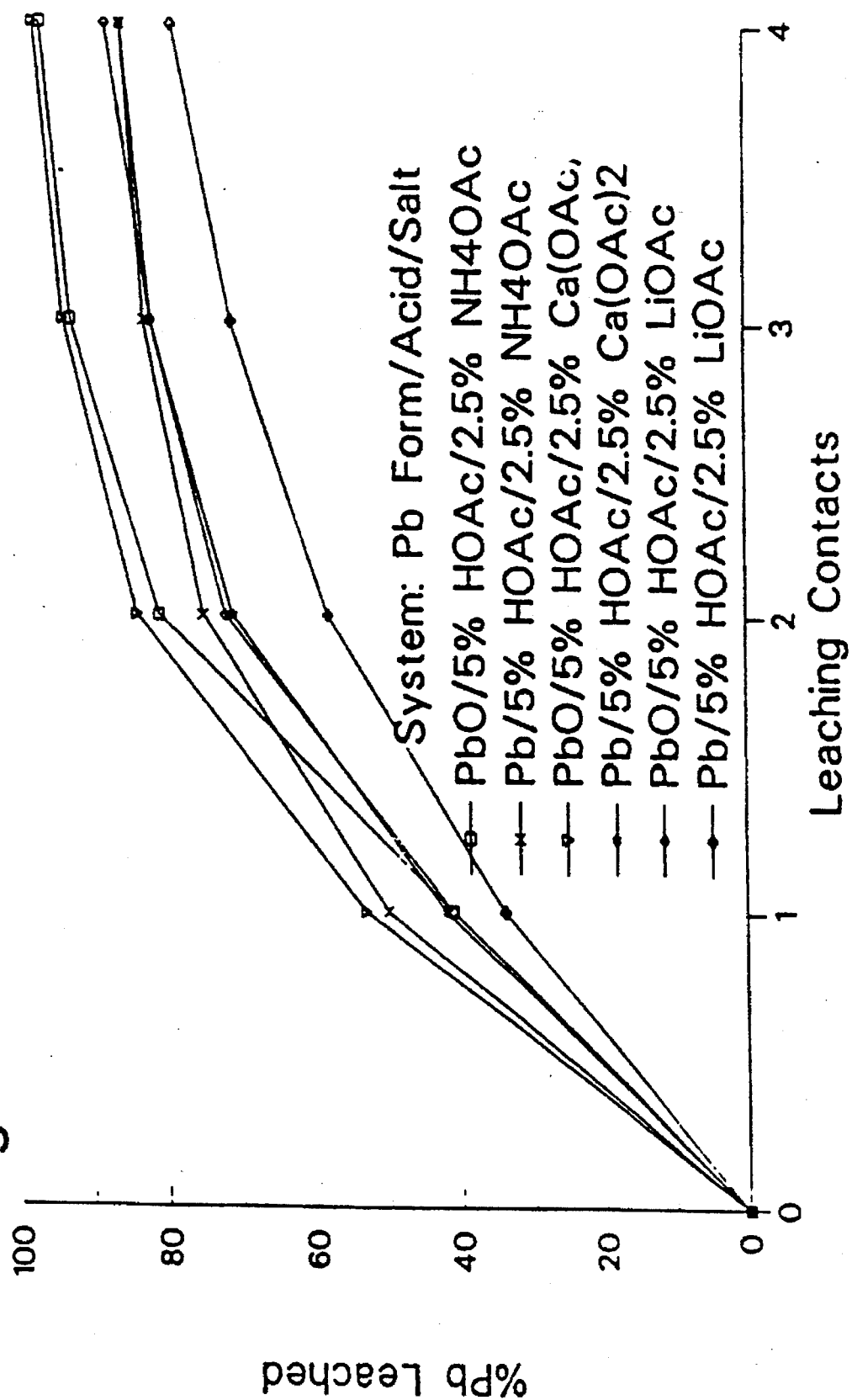
FIG. 6 is a graphic illustration of the effectiveness of 5% acetic acid/2.5% acetate salt solutions in leaching lead from various forms of lead in clay matrices.

FIG. 2 illustrates the high degree of effectiveness of a mild (pH=4) leachant, namely acetic acid plus ammonium or calcium acetate for leaching lead oxide from a clay matrix. FIG. 3 illustrates the degree of effectiveness of a lower pH leachant, 0.1M hydrochloric acid plus ammonium or calcium chloride for leaching lead oxide from a clay matrix. The novel leachants are substantially and surprisingly more effective than acetic acid or hydrochloric acid alone, ammonium or calcium acetate alone or with other additives as shown in FIG. 3 and FIG. 4. The novel acetic acid based leachants clearly leach more lead from contaminated soil faster than even the best hydrochloric acid based leachants as shown by curves repeated in FIG. 5. The acetic acid based leachants are also especially useful because they dissolve Pb metal at pH=4–7 as shown in FIG. 6. Thus, the repetitive use of the acetic acid/acetate-based leachants is very efficient and effective at removing lead from soil constituents.

The process can be modified by adding subsequent liquid-solid separation and heavy metal recovery steps. Accordingly, in this first modification of the process according to the invention, the leaching step as described above is followed by the steps of separating the liquid leachant from the solid soil particles by any liquid-solid separation technique such as settling, filtering or centrifuging, and recovering the dissolved heavy metal from the separated liquid leachant by contacting with a water-insoluble extractant or a precipitant in order to remove the heavy metal ions.

When a precipitant is used to remove the heavy metal ions the choice of the precipitant will depend upon the nature of the heavy metal contaminants and can be readily made by those skilled in the art. The use of such precipitants for aqueous waste solutions is described in "Treatment Technologies," Office of Solid Waste, U.S. EPA, Govt. Inst., Inc., 1990. Typically, the precipitants will be calcium hydroxide, sodium hydroxide, sodium carbonate, sodium sulfide or sodium dimethyldithiocarbamate. Such precipitants will typically be used in stoichiometric excess to the heavy metals in the leachant solution when the leachant is not recycled back to the leaching step.

The water insoluble extractant can be: (a) a complexing agent for the heavy metal ions which is either dissolved in a water-immiscible solvent, adsorbed on an inert, solid support or adsorbed on a membrane support; (b) an ion exchange resin or an ion selective membrane; or (c) a solid adsorbent material. Examples of complexing agents which can be used as extractants include but are not limited to: carboxylic acids, such as Versatic™ 911 (Shell), Neodecanoic™ acid (Exxon) or alpha-bromolauric acid; phosphorus acids, such as di-2-ethylhexylphosphoric acid, Cyanex™ 302 (Cyanamid, bis(2,2,4,4-trimethylpentyl) monothiophosphinic acid); phosphorus esters, such as tributyl phosphate or dibutyl butylphosphonate; phosphine oxides, such as trioctylphosphine oxide; phenolic oximes, such as LIX™ 84 (Henkel, 2-hydroxy-5-nonylacetophenone oxime) or LIX™ 860 (Henkel, 5-dodecylsalicylaldehyde oxime); beta-diketones, such as LIX™ 54 (Henkel, 1-phenyldecan-1,3-dione) or LIX™ 51 (Henkel, 1-(p-dodecylphenyl)-4,4,4-trifluorobutan-1,3-dione; amines, such as trilaurylamine or trioctylamine; quaternary ammonium salts, such as Aliquat™ 336 (Henkel, tricaprylammonium chloride); and 8-hydroxyquinolines, such as LIX™ 26 (Henkel, 7-dodecenyl-8-hydroxyquinoline). The preferred extractants are saturated, linear and branched carboxylic acids having from 7 to about 30 carbon atoms. Particularly preferred carboxylic acids are Neodecanoic™ acid (Exxon) and Versatic™ acids (Shell).

Examples of water immiscible solvents for dissolving the extractants are the aliphatic and aromatic hydrocarbons having flash points of 150° F. and higher and solubilities in water of less than 0.1% by weight. These solvents are also essentially non-toxic and chemically inert and the costs thereof are currently within practical ranges. Representative commercially available solvents include but are not limited to: Kermac 470B (an aliphatic kerosene available from Kerr-McGee-Flash Point 175° F.), Chevron Ion Exchange Solvent (available from Standard Oil of California—Flash Point 195° F.), Escaid 100 and 110 (available from Exxon-Europe—Flash Point of ≈180° F.), Norpar 12 (available from Exxon-U.S.A.—Flash Point 160° F.), Conoco C-1214 L (available from Conoco—Flash Point 160° F.), Aromatic 150 (an aromatic kerosene available from Exxon-U.S.A.—Flash Point 150° F.) and various other kerosenes and petroleum fractions available from other oil companies. The use of said water immiscible solvents to recover the heavy metal by solvent extraction is especially advantageous when the heavy metal extraction process is followed by bioremediation.

Solid supports for insoluble extractants can be nonfunctionalized resin beads. Examples of nonfunctionalized resin beads are the Amberlite™ XAD series, XAD-2, XAD-4, XAD-7 produced by Rohm and Haas.

Membrane supports are microporous polymeric films which may be imbibed with liquid extractants to selectively allow heavy metal ions to pass through. Such membranes are described in "Interphase Transfer Kinetics from Transport Measurements Through Supported Liquid Membranes", "ISEC '86 Int. Solv. Extract. Conf., Preprints, Vol. II," 1986, 255–262, the entire contents of which are incorporated herein by reference.

Extractants with a variety of functionalities can be adsorbed onto a solid support and used to extract heavy metals. The appropriate combination of extractant and solid support will depend on the metal to be extracted and the conditions desired for extraction and stripping and can be determined by one of ordinary skill in the art. One method of determining the appropriate combination for a particular application would be to select an extractant which shows the desired characteristics in liquid-liquid extraction, imbibing that extractant onto a candidate solid support, and evaluating its extraction and stripping performance with a representative leach solution containing the heavy metal to be extracted.

The water insoluble extractant can be an ion exchange resin which will exchange another ion or ions for the heavy metal ions. The functionality which can be used on the ion exchange resin will depend on the heavy metal to be extracted, the presence of other ions, and the pH of the aqueous phase. Examples of representative functionalities include sulfonic acid, carboxylic acid, tertiary amine, quaternary ammonium, and chelating groups such as aminodiacetic acid. Such ion exchange resins are described in "Ion Exchangers, Properties and Applications," K. Dorfner, Ann Arbor Sci. Publ., Ann Arbor, Mich., 1972 and "Ion Exchange," F. Helfferich, McGraw-Hill, N.Y., 1962 and their use is known to those skilled in the art.

Ion selective membranes are described in "Encyclopedia of Chemical Technology", Kirk-Othmer, 8, 727–9, the entire contents of which are incorporated herein by reference.

The solid adsorbent material can be coal, carbon, or crumb rubber. Coal is particulate bituminous, sub-bituminous, lignite or peat having a particle size of greater than about 16 mesh. Carbon is particulate carbon or activated carbon having a particle size greater than about 16 mesh (1.00 mm). Commercially available examples having a mesh size of 6×16 are Calgon type GRC-22™, GRC-20™, Norit-RO™, and Norit-C™. The use of coal and carbon for heavy metal extraction is described in Water Research 1982, 16, 1113–1118; Water Research 1986, 20, 449–452; and Water Research 1982, 16, 1357–1366, the entire contents of which are incorporated herein by reference. Crumb rubber is particulate rubber from recycled tires having a particle size of greater than about 16 mesh. The use of crumb rubber as a heavy metal extractant is described in Water Research 1981, 15, 275–282, the entire contents of which is incorporated herein by reference.

Figure 1A:
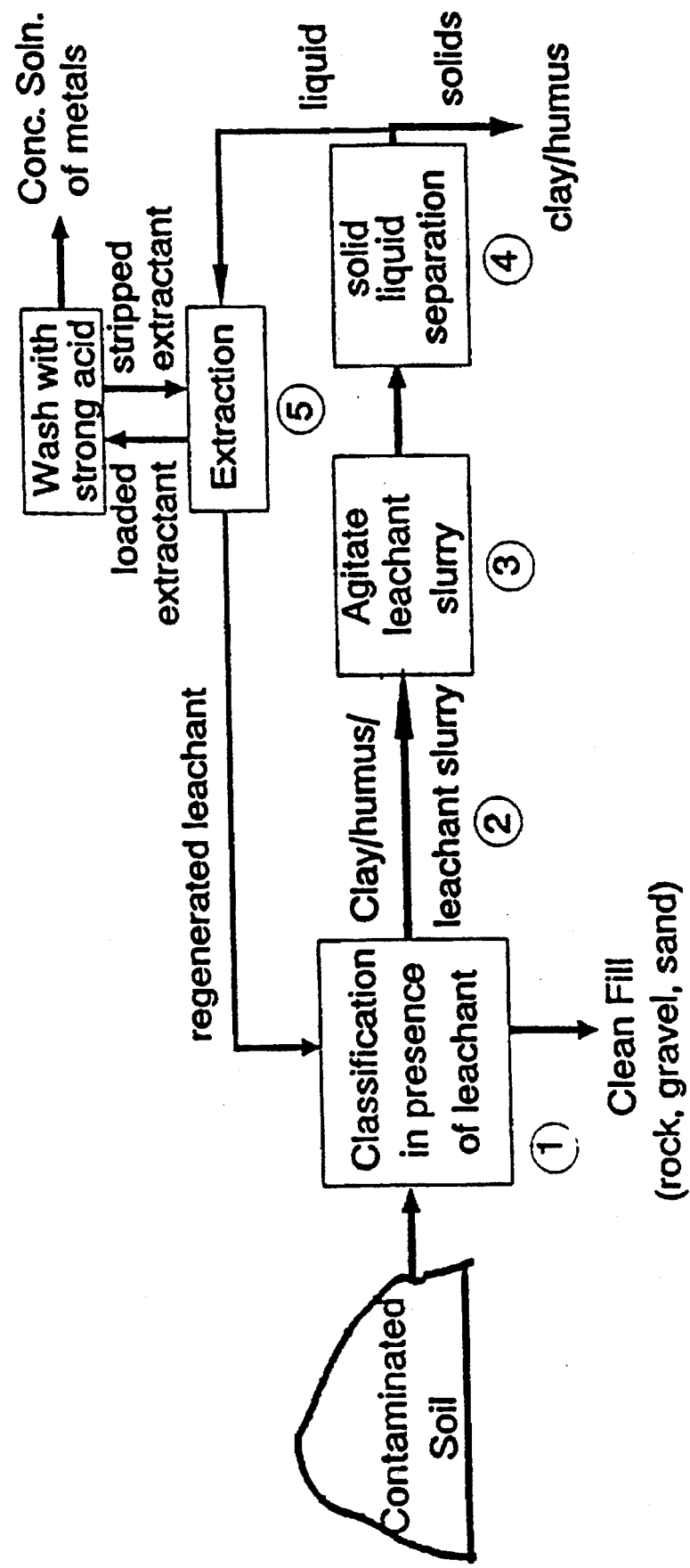
FIG. 1a is a process flow diagram for the first modification of the process according to the invention wherein the leaching step is continued after the optional classification step, the soil or soil fines are separated from the leachant solution, and the heavy metals are extracted from the clarified leachant solution.

FIG. 1a is a process flow diagram of the first modification of the process according to the invention. In the first step, soil is mixed with a leachant. Optionally, a prior size classification can be conducted in which the coarse particles which are removed are substantially free of heavy metal ions and are returned to the earth as clean fill. The soil or soil fines, which remain suspended as a slurry in step 2, and the leachant are further mixed together with the leachant in step 3 until the heavy metal ions are transferred from the soil or soil fines to the leachant as indicated by an analysis of a sample of the fines such as by atomic absorption spectroscopy. The time required to leach the heavy metals from the soil fines will typically be about 60 minutes or less. The soil or soil fines are then separated from the leachant in the solid/liquid separation step 4. The soil or clay/humus soil fines may be disposed of if they are sufficiently free of heavy metals or they may be returned to step 3 for further leaching. The liquid phase which results from the solid/liquid separation step contains dissolved heavy metal ions. This heavy metal-containing leachant is then extracted in step 5 with a solid or liquid extractant to remove the dissolved heavy metal ions. The heavy metal-loaded extractant is stripped by washing with strong acid to remove the heavy metals. The stripped extractant is then reused in the extraction step and the regenerated leachant is returned to the classification or leaching steps. Alternatively, the soil may be preclassified by another technique and only the soil fines leached, or the soil may be leached without classification.

The amount of extractant and mode of extraction are chosen so that the ion exchange capacity of the extractant or the adsorption capacity of the adsorbent for heavy metals is greater than the amount of heavy metals to be extracted. Thus in a single, batchwise contact of heavy metal containing leachant and extractant, an extraction or adsorption agent with an excess capacity for extraction or adsorption would be present.

A preferred embodiment of the process according to the invention comprises mixing contaminated soil comprised of coarse and fine particles with an aqueous solution comprised of (a) an acid whose anion forms a water-soluble salt with the heavy metal ions and (b) at least one alkali metal, alkaline earth metal, or ammonium salt having one or more anions which form water-soluble salts with the heavy metal ions to produce a liquid slurry phase and a coarse solid soil phase. The coarse solid phase is removed by classification, and the liquid slurry phase continues to be leached. The liquid slurry phase is then subjected to a liquid-solid separation to produce a clarified liquid phase containing at least a portion of the heavy metals and a solid phase containing the soil fines. The clarified liquid phase is then contacted with a water-insoluble extractant dissolved in a water-immiscible solvent, a water-insoluble extractant adsorbed on an inert solid support, an adsorbent, or an ion exchange resin to remove the heavy metals from the clarified liquid to produce regenerated leachant which is then returned for further leaching of contaminated soil. The solid phase containing the soil fines may be returned to further leaching with fresh or regenerated leachant. The leaching and liquid-solid separation of the soil fines is repeated until the heavy metal contaminants in the soil fines have been reduced to the desired levels such as those prescribed by state and federal regulatory agencies.

In another preferred embodiment, the aqueous leachant is comprised of acetic acid and an acetate salt of an alkaline earth metal or an ammonium ion as defined herein, and the extractant is activated carbon which removes the heavy metal ions from the liquid phase. The heavy metal ions are adsorbed by the carbon and can subsequently be removed from the carbon complex by washing with a strong acid. The heavy metals are then present in concentrated form in an acid solution for further isolation or processing.

In a second modification of the process according to the invention, both steps of leaching and contacting with a solid extractant as set forth herein are accomplished simultaneously. Since contacting the soil one time with a leachant may remove less than all of the heavy metals present in the soil sample, repeated contacts of soil with leachant will often be needed to sufficiently remove the metal ions. Therefore, this second modification of the process according to the invention comprises carrying out the leaching and extracting steps simultaneously by mixing contaminated soil fines simultaneously with a leachant component and a water-insoluble solid extractant component as disclosed herein. In this second modification the soil must be classified to the extent that the remaining soil fines are separable from the solid extractant. The size difference between the soil particles and extractant particles should be at least a factor of two and preferably at least a factor of ten. The leachant component is an aqueous solution comprised of an acid whose anion forms a water-soluble salt with said heavy metal ions and at least one alkali metal, alkaline earth metal, or ammonium salt having one or more anions which form water-soluble salts with said heavy metal ions. The extractant component is either a water-insoluble extractant adsorbed on an inert, solid adsorbent material or adsorbed on a membrane support; an ion selective membrane; a solid adsorbent; or an ion exchange resin. A liquid slurry phase is thus obtained which contains the leachant component, soil fines, dissolved heavy metal ions, and the extractant component now containing at least a portion of the heavy metal in complexed form. This extractant component is separated from the liquid slurry phase to remove the extractant component loaded with the heavy metal ion complex. The loaded extractant component is then contacted with a stripping solution to remove the heavy metal in concentrated form, and regenerate the extractant for further contact with liquid slurry phase.

The solid extraction component can be removed by passing the liquid slurry phase through a screen. A liquid slurry stream containing soil fines and heavy metals not removed in the first contact passes through the screen. This liquid slurry phase stream is then recycled back through the leaching process with fresh or regenerated solid extractant component for a number of cycles sufficient to reduce the heavy metal concentration in the soil fines to the desired levels such as those prescribed by state and federal regulatory agencies. An advantage of this modification is the avoidance of expensive and time-consuming repetitive liquid-solid separation to produce clarified aqueous solution following each successive contact of leachant with the soil. This modification of the process according to the invention can also be carried out in a continuous manner by continuously removing the loaded extractant component from the liquid slurry phase and adding fresh or regenerated extractant component so that the continuous leaching of the soil fines allows high metal removal. The liquid slurry phase and the solid extractant may also be continuously advanced counter-currently to each other. Thus the heavy metals dissolve into the leachant and are directly complexed by the extractant component. This prevents buildup of high heavy metal concentrations in the leachant, and displaces the dissolution equilibrium toward completion, giving more rapid and complete removal of heavy metals from the soil. The resulting low concentration of heavy metals in solution permits the use of leachant acids and salts that might not otherwise have adequate solubility with the heavy metal, such as lead sulfate, but will give sufficient solubility for simultaneous leaching and extraction.

The amount of solid extractant and mode of extraction are chosen so that the ion exchange capacity of the extractant or the adsorption capacity of the adsorbent for heavy metals is greater than the amount of heavy metals to be extracted. Thus in a single, batchwise contact of contaminated soil and extractant, an extraction or adsorption agent with an excess capacity for extraction or adsorption would be present. Alternatively, when the process is conducted continuously or with multiple contacts of the soil with extractant, the heavy metal concentration may initially be in excess of the capacity of the extractant present, but further contacting of the soil with fresh or regenerated extractant provides the excess capacity needed to remove substantially all of the heavy metal ions from the leachant solution.

Figure 1B:
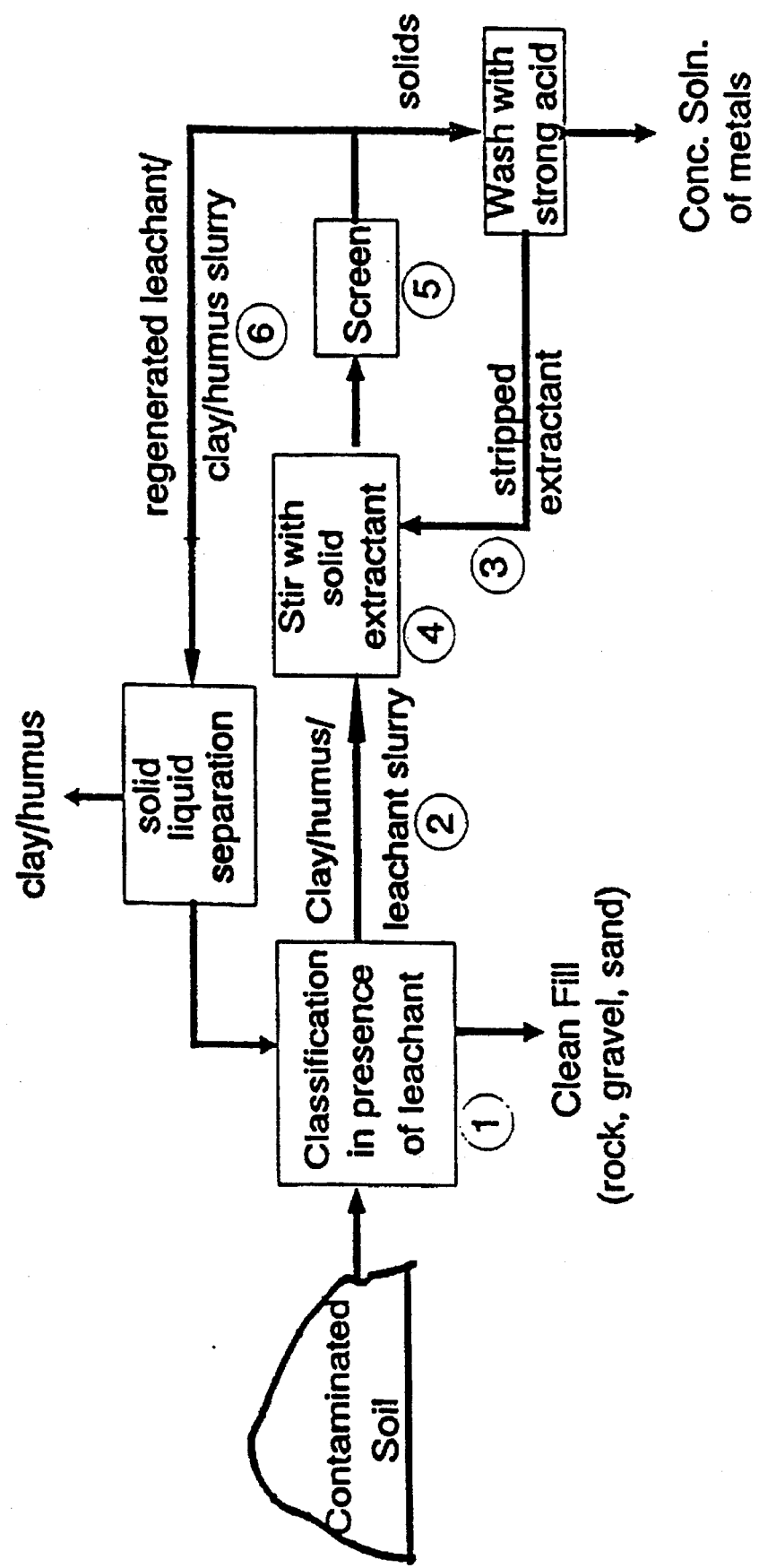
FIG. 1b is a process flow diagram for the second modification of the process according to the invention wherein the leaching step is continued after the classification step and combined with the extraction step wherein the extractant is a solid. The solid extractant is separated prior to the separation of the soil fines from the leachant solution. The solid extractant is stripped of extracted heavy metal ions, and the separated leachant solution is recycled for further leaching of contaminated soil.

FIG. 1b is a process flow diagram for one aspect of the second modification of the process according to the invention wherein the extractant is a solid as set forth herein. In the first step the soil is classified with the leachant, in the second step the soil fines remain suspended as a slurry in the leachant and are further mixed together with solid extractant in step 4 to transfer the heavy metals ions from the soil fines via the leachant to the solid extractant. The total time for steps 1 and 4 is the time required to leach the metals from the soil fines and will typically take about 60 minutes or less. The solid extractant is then removed in step 5 by passing the leachant-soil fines-extractant slurry through a screen and recovering a regenerated leachant/soil fines slurry from which the soil fines are then removed in step 6 to produce a regenerated leachant stream for recycle to the classification/leaching step. The heavy metal-loaded solid extractant is stripped by washing with strong acid to remove the heavy metals. The stripped extractant in step 3 is then reused in the extraction step 4. Alternatively, the contaminated soil may be preclassified by another technique and only the soil fines leached in step 4.

Figure 1C:
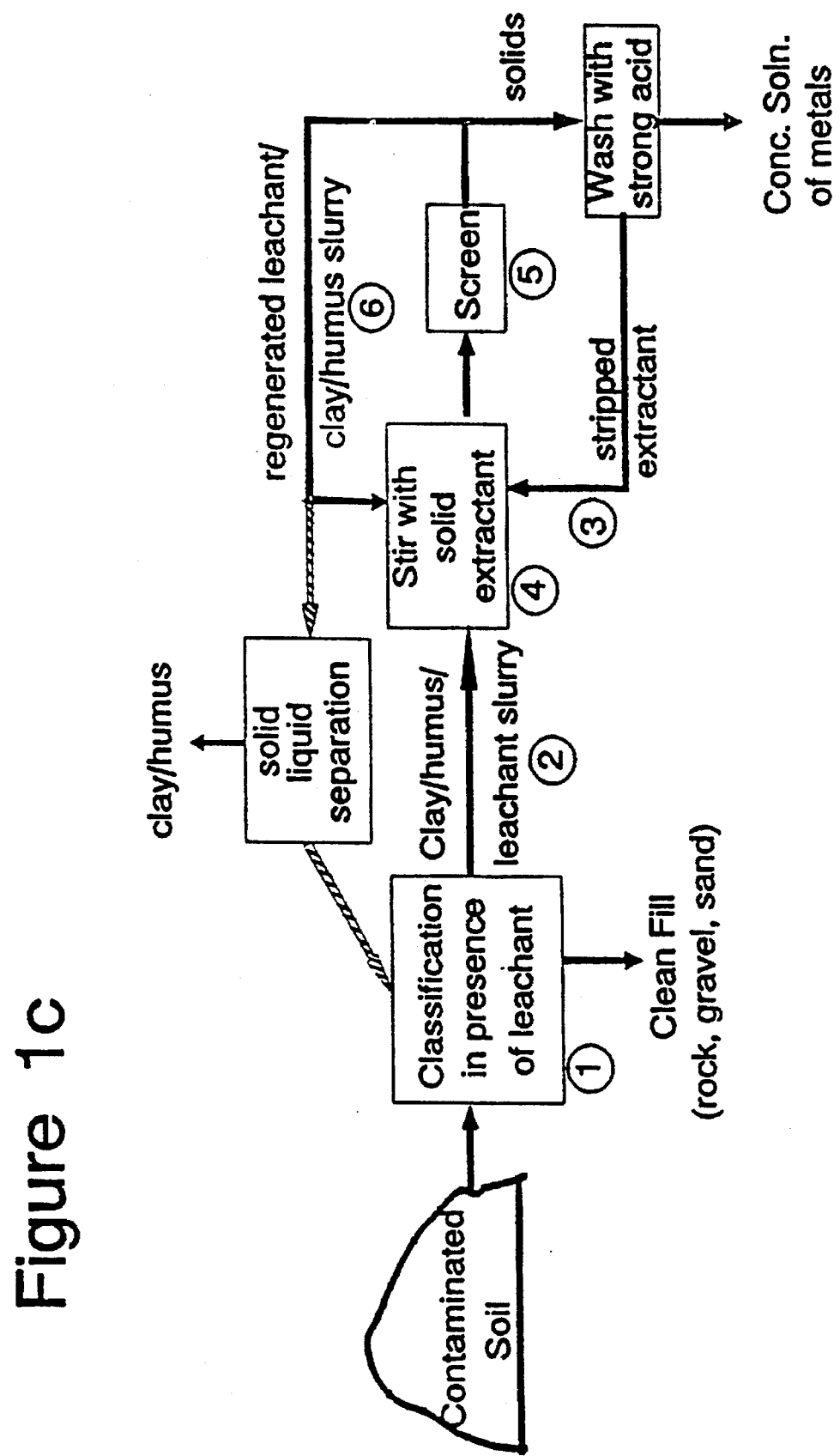
FIG. 1c is a process flow diagram for the operation of the second modification of the process according to the invention wherein the process of FIG. 1b is varied by recycling both the soil fines-leachant slurry and stripped extractant to leaching-extraction until an acceptable level of heavy metal removal has been attained.

A process flow diagram for another aspect of the second modification of the process according to the invention is depicted in FIG. 1c. The aspect is similar to that depicted in FIG. 1b except that the regenerated leachant containing the soil fines and formed after step 5 is recycled back into step 4. Thus, the soil fines are continuously and repeatedly contacted by the leachant and solid extractant until the heavy metal ion content reaches an acceptable value. This continuous process is depicted by the solid arrows. After the heavy metal ion concentration reaches an acceptable level, the process continues through the hatched arrows wherein the cleaned soil fines are separated from the leachant and returned to the earth as fill. The heavy metal-free regenerated leachant can be returned to step 1 of the process.

A preferred embodiment of the second modification of the process according to the invention is comprised of a leaching step which comprises contacting contaminated soil with a leachant comprised of an acid whose anion forms a water-soluble salt with said heavy metal ions and at least one alkali metal, alkaline earth metal, or ammonium salt having one or more anions which form water-soluble salts with said heavy metal ions. The coarse solid phase of denser or larger soil particles is then separated by known size separation techniques. This classifies, or size segregates, the soil so that the remaining first liquid slurry contains only fine soil particles, generally less than 0.02 mm in diameter. A carbon is added to produce a first liquid slurry phase and a coarse solid extractant phase. After sufficient time to transfer at least a portion of the heavy metals to the solid extractant, the first liquid slurry phase is passed through a screen having a mesh size of from about 80 (0.177 mm) to about 5 (4.00 mm) to remove the solid extractant phase which contains the heavy metal ion-carbon complex. A second liquid slurry phase stream containing soil fines and heavy metal ions not removed in the first contact results from this separation step and is recycled back to the leaching step. The solid extractant phase which remains on the screen is removed from the screen and the heavy metal ions are stripped by washing with a strong acid such as 3M hydrochloric acid. The stripped extractant-solid is recycled back to the leaching step. The heavy metals are then present in an acid solution in concentrated form for further isolation or processing to recover the heavy metals. After a sufficient number of leaching cycles, the treated solid soil may be separated from the leachant and returned to the earth. The processes according to the invention are particularly effective in removing lead, zinc, cadmium, and bismuth from contaminated soil.

The modified processes according to the invention can be even further altered by adding a bioremediation step at the end of the process. In other words, soil treated by the modified processes according to the invention in which the leaching step is followed by or carried out simultaneously with the extracting step or continuously with the extracting step can be freed of unwanted organic matter by subjecting the treated soil to bioremediation. Bioremediation is a process in which microorganisms are used to degrade organic contaminants to harmless by-products. An organic contaminant is any organic matter whose presence in soil renders the soil unfit for plant, animal or human contact or use. Examples of organic contaminants include hydrocarbon oils, gasoline, and heavier petroleum hydrocarbons; aromatic compounds such as benzene, toluene, xylene, and polynuclear aromatics; chlorinated hydrocarbons such as chlorinated benzenes, pentachlorophenol, and poly-chlorinated biphenyls; dioxin, herbicides and/or insecticides, and the like. Bioremediation may be accomplished by any method known to those skilled in the art such as by land treatment, bioreactors, and in-situ treatment. The use of bioremediation as a means of cleaning wastes of hazardous organic materials is described in the Aug. 26, 1991 edition of *Chemical and Engineering News*, pages 23–34, the entire contents of which are incorporated herein by reference. Bioremediation is often hindered or even prevented when heavy metals are present due to their high toxicity. Thus, removal of heavy metals may be a necessary first step to allow bioremediation to take place. The use of acetic acid and acetate salt as the leachant is particularly preferred when heavy metal recovery is to be followed by bioremediation, since it leaves a residue of an only mildly acidic solution in the soil, and the residual acetate can act as a nutrient to the remediating microorganisms.

In its simplest aspect, the process according to the invention which removes mercury from soil containing mercury can be carried out by mixing mercury-containing soil with a liquid leachant composition which is an aqueous solution of (i) an acid whose anion forms a water-soluble salt with mercury; (ii) an alkali metal, alkaline earth metal, or an ammonium salt having one or more anions which form water-soluble salts with mercury, and (iii) an oxidant selected from the group consisting of a persulfate salt, nitric acid, and a halogen in such a manner as to disperse at least part of said soil in the leachant to form a liquid phase containing dispersed soil solids and for a period of time sufficient to transfer at least a portion of the mercury from the dispersed solids to a soluble mercury species in the liquid phase. An acid whose anion forms a water-soluble salt with mercury according to the invention is any acid the anion or anions of which form a salt with mercury which has a solubility in water which is equal to or greater than $10^{-4}$ moles per liter. Examples of such acids include but are not limited to formic acid, acetic acid, propionic acid, methanesulfonic acid, hydrochloric acid, nitric acid, and sulfuric acid. A salt whose anion forms a water-soluble salt with mercury according to the invention is any alkali metal, alkaline earth metal, or an ammonium salt having one or more anions which form water-soluble salts with mercury as defined herein. An ammonium salt according to the invention is a salt having an ammonium ion of the formula $R_1R_2R_3NH^+$ wherein each of $R_1$, $R_2$, and $R_3$ is independently hydrogen, methyl, or ethyl. Examples of such salts include but are not limited to those salts the cations of which are $NH_4^+$, $Ca^{2+}$, $Mg^{2+}$, $Na^+$, $K^+$, or $Li^+$ and the anions are acetate, $Cl^-$, $NO_3^-$, or $HSO_4^-/SO_4^{2-}$. The contaminated soil and leachant are mixed together in any convenient manner such as by stirring the contaminated soil and the leachant solution together in a container. The ratio of soil to leachant will typically be 1 part by weight soil to from 2 to 10 parts by weight leachant. Preferably, the ratio of soil to leachant is 1 part by weight soil to from 2 to 5 parts by weight leachant. The soil will be contacted for a time sufficient to transfer at least a portion of the heavy metals and mercury to the leachant. The soil will typically be in contact with the leachant for up to 60 minutes. Optionally, at the start of the contacting period, a coarse solid phase of denser or larger soil particles, which is generally leached more rapidly than the soil fines, is separated by known size separation techniques, such as wet classification, centrifugal separation, hydrocyclone separation, or wet screening as set forth above. The mercury removal process can be carried out at any temperature and will typically be carried out at slightly elevated (40°–80° C.) temperature. The minimum acid concentration in the leachant solution must be such that a pH of 7 or below is maintained during the leaching period in which the soil and/or the soil fines are contacted by the leachant solution. The maintenance of the pH of the leachant solution can be accomplished by intermittent addition of the acid to the solution or by continuous addition of the acid to the solution. The method of addition is not critical as long as the pH is maintained below 7. While the acid concentration can be any concentration required to maintain the pH at or below 7, the maximum acid concentration in the leachant solution will typically be about 2 moles per liter. In cases where the acid is a weak acid such as acetic acid the preferred concentration is in the range of 1–10 wt % and more preferably, in the range of 1–5 wt %. In cases where the acid is a strong acid such as hydrochloric acid, the preferred concentration is in the range of 0.01–1 molar and more preferably in the range of 0.05–0.5 molar. The minimum salt concentration in the leachant solution will be typically 0.05% while the maximum salt concentration in the leachant solution will be about 20% by weight. A preferred salt concentration is within the range of 1–20 wt %. A more preferred salt concentration is within the range of 2–10%. The concentration of the oxidant in the leachant can range from about 1 eq to about 100 eq and will typically be from about 2 eq to about 50 eq. The preferred oxidant concentration will be from about 5 eq to about 25 eq. The oxidant is selected from the group consisting of a persulfate salt which includes an alkali metal or alkaline earth metal persulfate salt or, preferably, ammonium persulfate; nitric acid, and a halogen preferably bromine. The mercury removal process can be carried out in the same manner as that described previously for the removal of heavy metals from soil and may also be accomplished according to the process flow diagram as set forth in FIG. 1.

The process for removing mercury from soil can be modified by the addition of a cementation step after leaching. The cementation step comprises contacting the liquid phase containing the leached, soluble mercury species liquid phase with aluminum, iron, or magnesium to remove the soluble mercury species from liquid phase. The resulting process amounts to a complete remediation of mercury from the mercury-containing soil. Aluminum is the preferred metal for cementation. The amount of metal used in the cementation step is from about 1 eq to about 100 eq based on 1 eq of Hg with the preferred amount being in the range of from about 5 eq to about 50 eq. The metal will be in contact with the liquid phase for a period of time from about 1 min to about 5 hr, preferably from about 10 min to about 1 hr. A cementation step can also be added to the process for removing heavy metals other than mercury from soil or from paint chips when the metals removed are reduceable by the cementing metal, examples of which are copper or lead. In such a case, the liquid phase containing the leached, soluble lead or copper species is contacted with aluminum, iron, or magnesium to remove the soluble mercury species from liquid phase. Aluminum is the preferred metal for cementation. The amount of metal used in the cemetation step is from about 1 eq to about 100 eq based on 1 eq metal with the preferred amount being in the range of from about 5 eq to about 50 eq. The metal will be in contact with the liquid phase for a period of time from about 1 min to about 5 hr, preferably from about 10 min to about 1 hr.

The process according to the invention which removes lead, copper, or tin from paint chips containing one or more of said metals comprises contacting the paint chips with an aqueous acid leachant selected from the group consisting of formic acid, acetic acid, propionic acid, methanesulfonic acid, hydrochloric acid, nitric acid, and sulfuric acid for a period of time sufficient to transfer at least a portion of lead, copper, or tin or any combination thereof from the paint chips to one or more soluble species in the leachant. The process is carried out by contacting the paint chips with the leachant preferably by mixing the leachant and paint chips together in a vessel for a period of time from about 2 hr to about 12 hr. The ratio of leachant to paint chips or residue containing paint chips can be from about 2 to about 10 and is preferably from about 3 to about 5. The leaching process can be carried out at a temperature of from 10° C. to 100° C. or, preferably, from 20° C. to 80° C. Most preferably, the paint chips will be reduced to a fine particle size by grinding or the like to increase the surface area of the chips and hence facilitate the removal of the lead, copper, or tin therefrom. The time required to remove the metal will vary with the nature of the paint chips and the amount of metal in the paint chips and can be easily determined by those having ordinary skill in the art. The paint chips can be contacted repeatedly by the leachant until the metal level is sufficiently reduced to meet a level set by law or some other standard. In one embodiment wherein paint chips containing lead are leached according to the process of the invention, the leaching is continued until the lead level is below the TCLP limit (Toxicity Characteristic Leaching Procedure) as determined by RCRA SW-846, Method 1311. The soluble lead or copper species or a combination thereof can be removed from the solution which remains after leaching by contacting the liquid phase containing the leached, soluble lead or copper species with aluminum, iron, or magnesium to remove the soluble mercury species from liquid phase.

The following examples are meant to illustrate but not limit the invention.

EXAMPLE 1

Dissolution of Lead Metal by Various Leachants

Lead granules (0.20–0.30 g, 30 mesh) were stirred in an open 50 mL Erlenmeyer flask at 300 rpm with the following leachant solutions (25 mL) for 16 hrs, filtered, dried, and the residual lead weighed. The percent lead dissolved is listed in Table 1.

TABLE 1

| Leachant | % Pb Dissolved |
| --- | --- |
| 5% HOAc | 32 |
| 5% HOAc/5% HCl | 9 |
| 10% HOAc | 29 |
| 5% $NH_4OAc$ | 21 |
| 5% HOAc/2.5% NaOAc | 36 |
| 5% HOAc/2.5% $NH_4OAc$ | 43 |

The residual lead recovered from the acetic acid dissolution was not passivated by the treatment. Subjecting the residual lead from the 5% HOAc treatment to two additional acetic acid treatments gave a further 35% and 32% dissolution. Longer exposure of the lead granules to acetic acid led to more complete dissolution (63 hr, 97% dissolution). Results from similar experiments with lead and lead oxide are summarized in FIG. 6.

EXAMPLE 2

Dissolution of Lead Metal in a Matrix of Soil Constituents

Lead granules (30 mesh), the soil constituent (50 g), and leachant (5% HOAc/2.5% $NH_4OAc$) were stirred in open flasks for 66 hr before filtering and analyzing the filtrate for dissolved lead by atomic absorption spectroscopy. The results are shown in Table 2.

TABLE 2

| Pb in Soil | Soil Component | Leachant Vol (ml) | Pb Recovered |
| --- | --- | --- | --- |
| 0.1169 g | sand | 250 | 94% |
| 0.1132 g | clay #1 | 250 | 21% |
| 0.1162 g | clay #2 | 500 | 19% |

The recovery of lead from the sand matrix was as high as in the absence of sand (compare with Example 1). In the presence of clay, the recovery of lead was lower. The lower recovery in the presence of clay is consistent with the strong metal binding capability of clays. By comparison, experiments using acetic acid alone or hydrochloric acid alone as in FIGS. 2 and 3 show virtually no recovery of lead from a clay matrix.

EXAMPLE 3

Repetitive Leaching of a Lead Oxide/Clay Matrix by Various Acetic Acid Based Leachants Lead oxide (10 mg), clay (2 g), and leachant (10 mL) were stirred for 1 hr, centrifuged, the filtrate removed and analyzed, and fresh leachant added. The leachings were repeated three times. The results are shown in FIG. 2. The acetic acid/ammonium acetate and acetic acid/calcium acetate combinations are especially effective. The effectiveness of various percentages of acetic acid and ammonium acetate are shown in FIG. 4. The combination of acid and salt is surprisingly effective.

Repetition of the experiment with 16, 22, 22, and 22 hr contact times gave similar results; 5% HOAc removed 12%, 5% HOAc/2.5% $NH_4OAc$ removed 100%, and 5% HOAc/2.5% $Ca(OAc)_2$ removed 85% of the Pb. Repetition of the experiment with 30 minute contact times gave results identical to those with 60 minutes contact times.

EXAMPLE 4

Repetitive Leaching of a Lead Oxide/Clay Matrix by Various 0.1M Hydrochloric Acid Based Leachants Lead oxide (10 mg), clay (2 g), and leachant (10 mL) were stirred for 1 hr, centrifuged, the filtrate removed and analyzed, and fresh leachant added. The leachings were repeated three times. The results are shown in FIG. 3. The 0.1M HCl/NH$_4$Cl and 0.1M HCl/CaCl$_2$ combinations are especially effective, but the rate at which Pb is removed is slower than with the acetic acid based leachants.

EXAMPLE 5

Repetitive Leaching of Various Metal Oxides in a Clay Matrix by an Acetic Acid/Ammonium Acetate Leachant The metal oxide (10 mg), montmorillonite clay (2 g), and 5% acetic acid/2.5% ammonium acetate leachant (10 mL) were stirred for 1 hr, centrifuged, the filtrate removed and analyzed by atomic absorption, and fresh leachant added. The leachings were repeated three times. The cumulative percent metal leached is shown below. Bismuth and zinc are removed very efficiently.

| Metal Oxide | Cumulative % Metal Leached Leaching Contact | | | |
|---|---|---|---|---|
| | 1$^{st}$ | 2$^{nd}$ | 3$^{rd}$ | 4$^{th}$ |
| Bi$_2$O$_3$ | 62 | 89 | 97 | 99 |
| ZnO | 55 | 62 | 87 | 89 |

EXAMPLE 6

Extraction of Lead from Leachant by Carbon

A stock solution of 968 ppm lead was prepared in 5% acetic acid/2.5% ammonium acetate. A series of 6 dram vials were loaded with the stock solution (15 mL) and carbon (3 g). The vials were mixed by rotation and aliquots removed for analysis. The lead remaining in each starting solution is tabulated below. Activated carbon efficiently adsorbs lead from the acetic acid/ammonium acetate leachant.

| Carbon | % Available Lead adsorbed on C | | |
|---|---|---|---|
| | 1 | 4 | 22 hr |
| Calgon GRC-22 | 77 | 95 | 96 |
| Norit-RO | 91 | 83 | 89 |
| Norit-C | 94 | 94 | 95 |

EXAMPLE 7

Acid Stripping of Lead from Carbon

The lead bearing carbon (Calgon GRC-22, 3.00 g) from example 6 was rotated in a vial with 3M HCl (10 mL) for 3 hrs. The acid solution was removed and analyzed by atomic absorption, and fresh hydrochloric acid was added and stripping continued another 2 hr. The carbon was stripped of 54% of the bound lead.

EXAMPLE 8

Procedure for the Simultaneous Leaching and Extraction of Lead from Soil

A sandy loam (3 g) containing lead oxide (10 mg) is sieved through a No.4 (2.00 mm) sieve and mixed with a particulate activated carbon (Calgon GRC-22, 2 g) in a vial. The 5% acetic acid/2.5% calcium acetate leachant (15 mL) is added, and the slurry mixed by rotation (50 rpm) for 2 hr. The carbon particles are removed by sieving through a No. 4 sieve. The isolated carbon particles are washed with water to remove traces of adhering soil fines, dried in an oven at 105° C. and after microwave digestion the solution is analyzed by atomic adsorption. The lead is thus removed from the soil matrix and adsorbed onto the carbon particles.

EXAMPLE 9

Cementation by Aluminum

This example shows the effectiveness of aluminum as a cementation agent for removing lead and copper from loaded leachants. A leachate solution (100 mL) containing Pb, Cu, Cd, Zn, and Fe in 5% acetic acid/5% sodium acetate was stirred with crushed aluminum foil pieces (1.00 g) in an open beaker. Aliquots (5 mL) were removed periodically to monitor the cementation of heavy metal ions by the aluminum, filtered and subjected to ICP (Inductively Couple Plasmid Spectroscopy) analysis. The results, which are given in Table 3, show that aluminum successfully removed 99% or more of the copper and lead ions by reduction to insoluble elemental copper and lead.

TABLE 3

| | Metal Concentration (µg/mL) | | | | |
|---|---|---|---|---|---|
| Metal | t = 0 | t = 10 min | t = 0.5 hr | t = 4 hr | % Metal Removal |
| Cu | 56 | 36 | 0.4 | 0.4 | >99 |
| Pb | 826 | 801 | 17 | 11 | 99 |
| Cd | 7.5 | 7.5 | 7.5 | 7.9 | 0 |
| Zn | 6570 | 6450 | 7100 | 7390 | 0 |
| Fe | 68 | 67 | 67 | 69 | 0 |

EXAMPLE 10

Leaching of Lead From Paint Chips in Sandblasting Waste at Room Temperature

Sandblasting waste, sieved to a <2.00 mm fraction, contained sand, paint chips, and fines. The waste (2.00 g) and leachant (10.0 mL) were loaded into a polyethylene centrifuge tube, capped and shaken for 2 hr at room temperature (20°–22° C.). The tube and contents were centrifuged to give a solid pellet and leachant. The leachant was removed by pipette and weighed. The solid pellet was contacted again with fresh leachant. This contacting, centrifuging and replacement with fresh leachant was repeated a total of 5 times. The leachates were filtered (<0.45 µm) and analyzed by ICP for lead. The final treated solids were digested by the EPA acid digestion method and analyzed for lead. The results are shown in Table 4 for three leachants. The results indicate that at room temperature after five contacts partial lead removal (58–79%) from the waste was achieved.

TABLE 4

Leaching of Waste Sandblasting Sand (<2.00 mm) with
Various Leachants
Temperature = 22–25 °C.

| Leachant[3] | Cumulative % Pb Leached Leaching Contact # | | | | | Initial[1] [Pb] (ppm) | Final[2] [Pb] (ppm) |
|---|---|---|---|---|---|---|---|
| | 1 | 2 | 3 | 4 | 5 | | |
| 1 | 33 | 45 | 51 | 55 | 58 | 3635 | 1540 |
| 1 | 34 | 46 | 52 | 56 | 59 | 4094 | 1690 |
| 2 | 59 | 71 | 75 | 78 | 79 | 3913 | 818 |
| 2 | 55 | 68 | 72 | 75 | 76 | 3721 | 876 |
| 3 | 54 | 69 | 74 | 76 | 78 | 3855 | 848 |
| 3 | 58 | 71 | 76 | 79 | 80 | 3433 | 671 |

[1]Based upon the total Pb detected in leachant plus Pb retained in sand as determined by nitric acid digestion.
[2]Based upon nitric acid digestion of treated sand.
[3]Leachant:
1 = 5% acetic acid/5% calcium acetate
2 = 0.1M HCl/5% calcium chloride
3 = 0.5M HCl/5% calcium chloride.

EXAMPLE 11

Leaching of Lead From Paint Chips in Sandblasting Waste at 60° C.

The procedure described in Example 10 above was repeated at 60° C. The agitation was accomplished by magnetic stirring while heating in a water bath. The results are shown in Table 5 and show that the lead removal was much higher (87–96%) than in the corresponding experiments at room temperature.

TABLE 5

Leaching of Waste Sandblasting Sand (<2.00 mm) with
Various Leachants
Temperature = 60° C.

| Leachant[4] | Cumulative % Pb Leached Leaching Contact # | | | | | Initial[1] [Pb] (ppm) | Final[2] [Pb] (ppm) |
|---|---|---|---|---|---|---|---|
| | 1 | 2 | 3 | 4 | 5 | | |
| 1 | 63 | 76 | 81 | 85 | 89 | 3376 | 376 |
| 1 | 62 | 73 | 78 | 81 | 87 | 3226 | 429 |
| 3 | 82 | 91 | 94 | 94 | 95 | 3785 | 183 |
| 3 | 79 | 91 | 94 | 95 | 95 | 4267 | 197 |
| 4 | 82 | 91 | 93 | 94 | 96 | 4646 | 191 |
| 4 | 81 | 91 | 93 | 95 | 96 | 4354 | 154 |

[1]Based upon the total Pb detected in leachant plus Pb retained in sand as determined by nitric acid digestion.
[2]Based upon nitric acid digestion of treated sand.
[3]Leachant:
1 = 5% acetic acid/5% calcium acetate
3 = 0.5M HCl/5% calcium chloride
4 = 20% methanesulfonic acid.

EXAMPLE 12

Leaching of Mercury from Soil

Mercury metal (10–12 mg) was accurately weighed and mixed with clean soil (2.00 g, Goldridge Sandy Loam, Russian River Valley, Calif.) in a 50 mL rounded bottom flask equipped with a magnetic stirrer, condenser, and thermocouple. The mercury amended soil was stirred with 5% acetic acid/5% calcium acetate (10 mL) containing ammonium persulfate (10 and 25 eq.) at 60° C. for 1 hr. The resulting soil slurry was quantitatively transferred to a 50 mL polyethylene centrifuge tube, centrifuged, and the supernate decanted and analyzed. The remaining soil was leached with 5% acetic acid/5% calcium acetate solution (10 mL), centrifuged, and the supernate decanted five times. All supernates were analyzed for mercury by ICP, and the remaining soil was acid digested (EPA Method 3050) to determine the residual mercury concentration in the treated soil. The results are shown in Table 6.

TABLE 6

| Mercury Removal from Soil | | | | | | | | |
|---|---|---|---|---|---|---|---|---|
| Persulfate (Eq.) | Contact #, Leachate (μg/g Hg) | | | | | | Residual Hg (μg/g) | Recovered Hg (%) |
| | 1* | 2 | 3 | 4 | 5 | 6 | | |
| 10 | 316 | 264 | 156 | 44 | 22 | 16 | 1940 | 65 |
| 25 | 464 | 216 | 203 | 80 | 26 | 12 | 1010 | 81 |

*Only the first contact contained oxidant plus leachant. Remaining contacts were done with leachant only.

EXAMPLE 13

Cementation of Mercury by Aluminum

Two solutions of mercuric chloride in (a) 5% acetic acid/5% calcium acetate and (b) 0.1M HCl/5% calcium chloride were prepared, approximately 350 ppm Hg. A portion of each solution (25 mL) was stirred with crushed aluminum foil pieces (25 mg) under nitrogen. Aliquots (5 mL) were removed periodically to monitor the cementation of the mercuric ion by the aluminum, filtered and subjected to ICP analysis. The results are in Table 3. It is readily apparent that aluminum successfully removed the mercuric ion by reduction to insoluble elemental mercury or reduction and amalgation to excess aluminum.

TABLE 7

| Leachant | Hg Concentration (μg/mL) | | | | % Hg Removal |
|---|---|---|---|---|---|
| | t = 0 | t = 0.5 hr | t = 1 hr | t = 2 hr | |
| HOAc/Ca(OAc)$_2$ | 365 | 311 | 23 | <1 | >99 |
| HCl/CaCl$_2$ | 359 | 12 | <1 | <1 | >99 |

EXAMPLE 14

Electrowinning of Lead-Containing Leachant

The leachate was produced by mixing 300 g of soil (21,000 ppm of Zn; 4,500 ppm of Pb) with 3 L of a 5%HOAc/5%NaOAc solution. The mix was put on an Eberbach tableshaker for 1.5 hrs and then allowed to settle over night. The next day the supernatant was decanted off: analysis indicated a leachate Pb concentration of 215 ppm and a Zn concentration of 1,770 ppm. An electrowinning cell with the following materials and dimensions was used: four aluminum cathodes (2.9"w×3.5"h- total area of 81.2 in$^2$; five titanium anodes (2.0"w×3.0"h- expanded metal); electrowinning cell- liquid dimensions of 2.6"×3.5×7.0"l, for a total volume of 64 in$^3$=1054 ml; a leachate reservoir of 2L; tubing of ¼"ID. The plates were placed in alternating fashion with a distance of ½"between anodes and cathodes. 2 L of the above leachate was recycled through the system via a FMI pump and a rate of 120 ml/min. Electric current was established at 2.25 V and at which point gas evolution was noted; voltage was then reduced to 1.75 V and maintained for 5 hrs.

Aliquots were taken every hour and analyzed for Pb:

| Sample | Resulting Pb levels |
| --- | --- |
| 1 hr | 216 |
| 2 hr | 172 |
| 3 hr | 140 |
| 4 hr | 118 |
| 5 hr | 99.5 |

EXAMPLE 15

In this example experimental runs were made in relation to leaching of lead from sand fines (fines from a rifle range using a leachant comprised of a strong mineral acid (hydrochloric acid) plus a weak acid (acetic) in combination with two levels of salt either sodium chloride or calcium chloride. The summary Table 8 below and Spreadsheet Table 9 below show the results. The conditions of the runs were as follows:

Conditions:
soil: Firing range fines found to contain 4–4.5% lead
Leachants:(20 ml volume)
1.) 0.01M Hcl / 1%wt NaCL [0.17M]/ 1%wt HOAc
2.) 0.01M Hcl / 1.9% $CaCl_2$ [0.17M]/ 1%wt HOAc
3.) 0.01M Hcl / 2.6% NaCl [0.45M]/ 1%wt HOAc
4.) 0.01M Hcl / 5% $CaCl_2$ [0.45M]/ 1%wt HOAc
Ratio: 1:10 soil to leachant
Contacts: Four consecutive 15 minute contacts at room temperature
Agitation: Wrist Action Shaker, High

TABLE 8

| Leachant | % Removal | Residual [Pb] (ppm) | Leached [Pb] (ppm) |
| --- | --- | --- | --- |
| 1: 0.01M Hcl/ 1% NaCl/1% HOAc | 75/73 | 9,990/10,900 | 29,723/29,378 |
| 2: 0.01M Hcl/ 1.9% $CaCl_2$/1% HOAc | 82/80 | 7,350/8,170 | 33,297/33,044 |
| 3: 0.01M Hcl/ 2.6% NaCl/1% HOAc | 77/77 | 8,800/8,800 | 30,015/30,229 |
| 4: 0.01M Hcl/ 5% $CACl_2$/1% HOAc | 86/87 | 5,560/5,390 | 34,888/34,802 |

From these results the calcium seems to give an advantage over sodium and a higher concentration of salt may give a slight advantage over a lower concentration.

Note: During a Treatability Study (TS), it was also found that a leachant of only strong mineral acid and salt (5% calcium chloride adjusted to pH 1 with hydrochloric acid) removed 81–83% of the lead in four 15 minute contacts at pH 1 (first contact went to pH 1.4 and came right down in second contact to pH 1). The concentration of lead reached in that TS study was 35,474 and 36,050 ppm in duplicate examples, which results are very comparable to the result above in this example using leachant #4 at pH 2.3–3.4.

TABLE 9

T.S. #  N/A                              Metal: LEAD
Date:   5/16/95                          Leachant: VARIOUS
Comments/Notes: 4 × 15 Minute Contacts   Leachant Volume: 20 mL

| Sample # | pH | Contact # | Metal in Leachate (ug/mL) | Leachate Weight (g) | Metal Leached (ug) | Total Metal Leached (ug) | Total Metal (ppm) | Metal Removed (%) |
| --- | --- | --- | --- | --- | --- | --- | --- | --- |
| 11 | 3.63 | 1 | 1460.00 | 18.22 | 28601 | 26801 | 13301 | 33% |
| 12 | 3.04 | 2 | 774.00 | 20.35 | 15751 | 42352 | 21176 | 53% |
| 13 | 2.7 | 3 | 499.00 | 20.37 | 10165 | 52517 | 26258 | 66% |
| 14 | 2.5 | 4 | 339.00 | 20.44 | 6929 | 59446 | 29723 | 75% |
| 15 | Residual Metal in soil: 9990 | | | | | | | |
| | Soil wt. (g) | 2.00 | | | Total Metal in Sample (ppm) | | 39713 | |
| 21 | 3.53 | 1 | 1170.00 | 18.38 | 21505 | 21505 | 10752 | 27% |
| 22 | 3.19 | 2 | 906.00 | 20.26 | 18356 | 39860 | 19930 | 49% |
| 23 | 2.77 | 3 | 559.00 | 20.18 | 11281 | 51141 | 25570 | 63% |
| 24 | 2.53 | 4 | 372.00 | 20.47 | 7615 | 58756 | 29378 | 73% |
| 25 | Residual Metal in Soil: 10900 | | | | | | | |
| | Soil wt. (g) | 2.00 | | | | | 40278 | |
| 31 | 3.48 | 1 | 1730.00 | 18.42 | 31867 | 31867 | 15933 | 39% |
| 32 | 2.95 | 2 | 881.00 | 20.42 | 17990 | 49857 | 24928 | 61% |
| 33 | 2.61 | 3 | 511.00 | 20.22 | 10332 | 60189 | 30095 | 74% |
| 34 | 2.42 | 4 | 310.00 | 20.66 | 6405 | 66594 | 33297 | 82% |
| 35 | Residual metal in Soil: 7350 | | | | | | | |
| | Soil wt. (g) | 2.00 | | | Total Metal in Sample (ppm): | | 40647 | |
| 41 | 3.49 | 1 | 1680.00 | 18.35 | 30828 | 30828 | 15414 | 37% |
| 42 | 2.98 | 2 | 896.00 | 20.49 | 18359 | 49187 | 24594 | 60% |
| 43 | 2.63 | 3 | 517.00 | 20.22 | 10454 | 59641 | 29820 | 72% |
| 44 | 2.43 | 4 | 317.00 | 20.34 | 6448 | 66089 | 33044 | 80% |
| 45 | Residual Metal in Soil: 8170 | | | | | | | |
| | Soil wt. (g) | 2.00 | | | Total Metal in Sample (ppm): | | 41214 | |
| 51 | 3.68 | 1 | 1410.00 | 18.8 | 26508 | 26508 | 13254 | 34% |
| 52 | 3.14 | 2 | 816.00 | 20.52 | 16744 | 43252 | 21626 | 56% |
| 53 | 2.74 | 3 | 511.00 | 20.24 | 10343 | 53595 | 26797 | 69% |
| 54 | 2.52 | 4 | 317.00 | 20.3 | 6435 | 60030 | 30015 | 77% |
| 55 | Residual Metal in Soil: 8800 | | | | | | | |
| | Soil wt. (g) | 2.00 | | | Total Metal In Sample (ppm): | | 38815 | |
| 61 | 3.67 | 1 | 1400.00 | 18.79 | 26306 | 26306 | 13153 | 34% |
| 62 | 3.18 | 2 | 820.00 | 20.36 | 16695 | 43001 | 21501 | 55% |
| 63 | 2.78 | 3 | 525.00 | 20.24 | 10626 | 53627 | 26814 | 69% |

TABLE 9-continued

| | | | | | | | | |
|---|---|---|---|---|---|---|---|---|
| 64 | 2.53 | 4 | 339.00 | 20.15 | 6831 | 60458 | 30229 | 77% |
| 65 | Residual Metal in Soil: 8800 | | | | | | | |
| | Soil wt. (g) | 2.00 | | Total Metal in Sample (ppm): | | 39029 | | |
| 71 | 3.37 | 1 | 1940.00 | 18.94 | 36744 | 36744 | 18372 | 45% |
| 72 | 2.78 | 2 | 886.00 | 20.89 | 18509 | 55252 | 27626 | 68% |
| 73 | 2.56 | 3 | 460.00 | 20.65 | 9499 | 64751 | 32376 | 80% |
| 74 | 2.33 | 4 | 244.00 | 20.59 | 5024 | 69775 | 34888 | 86% |
| 75 | Residual Metal in Soil: 5560 | | | | | | | |
| | 2.8 | 2.00 | | Total Metal in Sample (ppm): | | 40448 | | |
| 81 | 3.37 | 1 | 1930.00 | 18.98 | 36631 | 36631 | 18316 | 46% |
| 82 | 2.88 | 2 | 904.00 | 20.3 | 18351 | 54983 | 27491 | 68% |
| 83 | 2.53 | 3 | 464.00 | 20.48 | 9503 | 64485 | 32243 | 80% |
| 84 | 2.33 | 4 | 249.00 | 20.58 | 5119 | 69605 | 34802 | 87% |
| 85 | Residual Metal in soil: 5390 | | | | | | | |
| | Soil wt. (g) | 2.00 | | Total Metal In Sample (ppm): | | 40192 | | |

Note:
1 and 2 series = 0.01M HCl/1% NaCl/1% HOAc
3 and 4 series = 0.01M HCl/1.9% CaCl2/1% HOAc
5 and 6 series = 0.01M HCl/2.6% NaCl/1% HOAc
7 and 8 series = 0.01M HCl/5% CaCl2/1% HOAc In the foregoing example the leachant systems were employed on sand fines from a firing range which contained lead. The leachant system herein may also be employed in a sandblasting waste which contains paint chips containing lead as in examples 10 and 11 above. Typically paints form films of a solid matrix containing pigments and other adjuvants. Because lead containing paints present a hazard, which must be removed, such lead based paints, are typically sandblasted off the substrates to which they were applied, breaking the paint film into small particles referred to as "chips", which are then found admixed with the sand fines employed for sandblasting the paint from the substrate. This sandblasting waste mixture which is accordingly comprised of sand and chips or particles of paint, which contain lead in a solid matrix from the paint film can be treated with the leachants described above for treatment of the firing range fines, to leach the lead from the dispersion of sand and paint solids matrix. The lead is leached from the matrix without any dissolution of the paint solids matrix itself.

What is claimed is:

1. A process for removing lead from sandblasting wastes comprised of sand and lead containing solid paint chips, which process comprises (1) contacting the sand and solid paint chips with a liquid leachant comprised of (a) a strong mineral acid selected from the group consisting of hydrochloric acid and sulfuric acid in a concentration of 0.01M to about 1.0M and (b) from 1 to about 20% by weight of an alkali metal, alkaline earth metal, or ammonium salt having one or more anions which form water soluble salts with lead, in such a manner so as to disperse at least a part of the sand and solid paint chips in the leachant to form a liquid phase containing dispersed sand and paint solids and for a period of time sufficient to render at least a portion of the lead from the dispersed solids to a soluble species in the liquid, and (2) recovering the lead from the liquid phase.

2. A process as defined in claim 1 in which said salt is selected from the group consisting of sodium chloride and calcium chloride.

3. A process as defined in claim 1 wherein said liquid leachant further comprises (c) from 1 to about 10% by weight of a weak acid.

4. A process as defined in claim 3 in which said weak acid is selected from the group consisting of acetic acid, formic acid, citric acid and propionic acid.

5. A process as defined in claim 3 wherein the strong mineral acid is hydrochloric acid, the salt is selected from the group consisting of sodium chloride and calcium chloride and the weak acid is acetic acid.

6. A process as defined in claim 1 in which said process further comprises recovering the lead by (3) contacting the liquid phase from step (2) with a metal selected from the group consisting of aluminum, iron and magnesium to remove the soluble lead from the liquid phase.

7. A process as defined in claim 5 wherein the hydrochloric acid concentration is 0.01M, the acetic acid concentration is 1 w/v% and the salt is calcium chloride in a concentration of 0.17M to 0.45M.

* * * * *